(12) United States Patent
Fujimori

(10) Patent No.: US 8,773,533 B2
(45) Date of Patent: Jul. 8, 2014

(54) DETECTION SYSTEM, SIGNAL PROCESSING METHOD OF DETECTION SYSTEM, AND SMOKE SENSOR

(75) Inventor: Jun Fujimori, Sitama (JP)

(73) Assignee: Rhythm Watch Co., Ltd., Saitama (JP)

( * ) Notice: Subject to any disclaimer, the term of this patent is extended or adjusted under 35 U.S.C. 154(b) by 434 days.

(21) Appl. No.: 13/266,149

(22) PCT Filed: May 13, 2010

(86) PCT No.: PCT/JP2010/058121
§ 371 (c)(1),
(2), (4) Date: Oct. 25, 2011

(87) PCT Pub. No.: WO2010/131714
PCT Pub. Date: Nov. 18, 2010

(65) Prior Publication Data
US 2012/0038768 A1    Feb. 16, 2012

(30) Foreign Application Priority Data
May 13, 2009   (JP) ................................. 2009-117025

(51) Int. Cl.
*H04N 7/18* (2006.01)
*G08B 17/10* (2006.01)

(52) U.S. Cl.
CPC . *H04N 7/18* (2013.01); *G08B 17/10* (2013.01)
USPC ........................................ 348/143; 73/28.01

(58) Field of Classification Search
CPC ....................................................... H04N 7/18
See application file for complete search history.

(56) References Cited

U.S. PATENT DOCUMENTS

2006/0232692 A1    10/2006    Takane

FOREIGN PATENT DOCUMENTS

| JP | 63-308484 A | 12/1988 |
| JP | 9-130806 A | 5/1997 |
| JP | 10-289321 A | 10/1998 |
| JP | 3019309 B2 | 3/2000 |
| JP | 2006-295763 A | 10/2006 |
| JP | 2007-179266 A | 7/2007 |
| JP | 2008-141251 A | 6/2008 |

*Primary Examiner* — Jorge L Ortiz Criado
*Assistant Examiner* — Paul Myers, III
(74) *Attorney, Agent, or Firm* — Birch, Stewart, Kolasch & Birch, LLP

(57) ABSTRACT

A detection system on detecting a light source or an object irradiated by the light source serving as an object to be photographed with high accuracy and capturing a vivid image of the object to be photographed and a signal processing method and a smoke sensor. A detection system includes an image pickup unit, a light source, a first computing unit, a second computing unit, a third computing unit, a detecting unit, and a correction instructing unit. The correction instructing unit outputs a correction instructing signal when the absolute value of a computation result A or that of a computation result B exceeds a permissible decrement. The third computing unit corrects the computation result of which absolute value is reduced between the computation results such that the decrement is less than or equal to the permissible decrement when receiving the correction instructing signal, and performs computation.

13 Claims, 25 Drawing Sheets

| | Ye Mg | Cy G | Ye Mg | Cy G | Ye Mg | Cy G | Ye Mg | Cy G | Ye Mg | Cy G |
|---|---|---|---|---|---|---|---|---|---|---|
| ODD FIELD OFD | | | | | | | | | | |

| | Mg Ye | G Cy | Mg Ye | G Cy | Mg Ye | G Cy | Mg Ye | G Cy | Mg Ye | G Cy |
|---|---|---|---|---|---|---|---|---|---|---|
| EVEN FIELD EFD | | | | | | | | | | |

| SAMPLING FREQUENCY | 4 × $f_{sc}$ ($f_{sc}$ = 3.579545Mhz) | |
|---|---|---|
| SAMPLE/LINE | 910 | |
| VALID SAMPLE NUMBER /LINE | 768 | |
| QUANTIZATION LEVEL | 8 BITS | ANALOG VALUE |
| SYNCHRONIZATION LEVEL | 4 (04h) | −40 IRE |
| BLANKING LEVEL | 60 (3Ch) | 0 IRE |
| WHITE LEVEL | 200 (C8h) | 100 IRE |

FIG. 10

|  | SUPPRESSION LEVEL | CONVERSION VALUE |
|---|---|---|
| INVALIDATING MODE | L0 | Lu = 1 |
| VALIDATING MODE | L1 | Lu = 0.703 |
|  | L2 | Lu = 0.625 |
|  | L3 | Lu = 0.546 |

| D | $SUM = S_{AC}^2 + S_{BD}^2$ |
|---|---|
| 0 | 0 |
| 0.1 | 0.00866662 |
| 0.2 | 0.02933328 |
| 0.3 | 0.05399997 |
| 0.4 | 0.07466662 |
| 0.5 | 0.08333325 |
| 0.6 | 0.07466662 |
| 0.7 | 0.05399997 |
| 0.8 | 0.02933328 |
| 0.9 | 0.00866662 |
| 1 | 0 |

FIG. 18
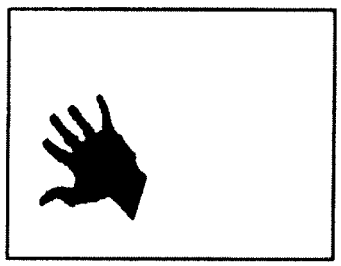 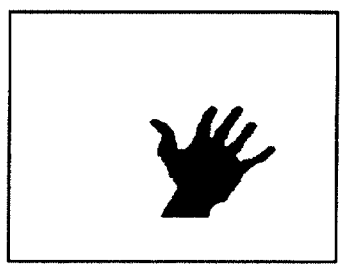 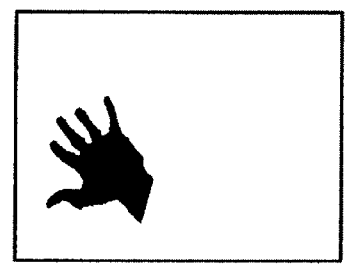
(A) (B) (C)

DETECTION SYSTEM, SIGNAL PROCESSING METHOD OF DETECTION SYSTEM, AND SMOKE SENSOR

TECHNICAL FIELD

The present invention relates to a detection system which uses an imaging apparatus to detect a state of an object, a signal processing method of the detection system, and a smoke sensor which employs this detection system.

BACKGROUND ART

When capturing an image of an object illuminated by an incandescent light bulb, fluorescent lamp, or other light source by using an imaging apparatus which has a CCD (charge coupled device) or other imaging element mounted therein, sometimes a striped pattern of light and shade is formed in the captured image and it is difficult to discriminate what the object is.

This is because, in contrast to an interlace type imaging apparatus wherein a field frequency is generally about 60 Hz, a modulation frequency of a light source is about 100 Hz or 120 Hz, so there is a deviation in the image capturing timing depending on the commercially available power supply frequency (50 Hz or 60 Hz).

In order to solve such a problem, for example, an imaging apparatus shown in PLT 1 is disclosed. In the art described in this PLT 1, the imaging apparatus captures an image of the object with a higher frame rate than the modulation frequency of the light source.

In this regard, in general imaging apparatuses being circulated on the market, the majority apparatuses are compatible with the NTSC (National Television System Committee) system or PAL (Phase Alternating Line Standard) system. For example, in the NTSC system, by interlace scanning, the field frequency is set to about 60 Hz and the frame rate (frame frequency) is set to 30 Hz.

Accordingly, it is difficult to raise the frame rate as in the imaging apparatus disclosed in PLT 1.

In a detection system described in PLT 2, the luminance of the light source is changed by a predetermined multiple of the scan period of the imaging apparatus, and the imaging apparatus captures the image of the object illuminated by this light source.

Due to this, not only can the object be vividly captured, but it is also not necessary to raise the frame rate itself of the imaging apparatus, therefore use can be made of a general imaging apparatus being circulated on the market.

CITATION LIST

Patent Literature

PLT 1: Japanese Patent No. 3019309
PLT 2: Japanese Patent Publication (A) No. 2008-141251

SUMMARY OF INVENTION

Technical Problem

However, in the detection system disclosed in PLT 2, the flicker frequency of the light source and the scanning frequency of the imaging apparatus are asynchronous. Therefore, due to the effect of jitter etc. in the imaging apparatus, the object was sometimes erroneously detected. In this case, the imaging screen projected in on a television receiver flickers and becomes unclear.

For this reason, it has been desired to be able to detect a light source being captured or an object illuminated by that light source with a high precision and to clearly capture an imaging target even when the flicker frequency of the light source and the scanning frequency of the imaging apparatus are asynchronous.

The present invention provides a detection system which is able to detect a light source being captured or an object illuminated by that light source with a high precision and to clearly capture an imaging target, a signal processing method of the detection system, and a smoke sensor.

Solution to Problem

A detection system of the present invention has an image capturing unit which captures an image; a light source which has a luminance which changes by a period of a predetermined multiple of a scanning plane period of the image capturing unit; a pre-processing unit which acquires an output signal at the time when the image capturing unit captures the light source or object for each predetermined scanning plane period, calculates a first time-average value of the output signal level difference between the m (m=1, 2, ... )th and (m+2)th scanning planes, and calculates a second time-average value of the output signal level difference between the (m+1)th and (m+3)th scanning planes; a post-processing unit which executes processing which uses the first time-average value and the second time-average value calculated by the pre-processing unit as the basis to detect the state of the light source or the object; a detection unit which detects the state of the light source or the object in accordance with the processing value of the post-processing unit; and a correction instruction unit which outputs a correction instruction signal in a case where an absolute value of either of the first time-average value and the second time-average value of the pre-processing unit exceeds an allowable drop, wherein the post-processing unit corrects the time-average value of the time-average value which drops in absolute value so that the drop becomes the allowable drop or less when receiving the correction instruction signal of the correction instruction unit and then executes the above processing.

A signal processing method of a detection system of the present invention is a signal processing method of a detection system which has a light source and an image capturing unit which captures an image of a light source or an object illuminated by the light source, which has a first step of changing a luminance of the light source by a period of a predetermined multiple of a scanning plane period of the image capturing unit; a second step of acquiring an output signal of the image capturing unit for each predetermined scanning plane period; a third step of calculating a first time-average value of the output signal level difference between the m-th and (m+2)th scanning planes and calculating a second time-average value of the output signal level difference between the (m+1)th and (m+3)th scanning planes from the output signals acquired in the above second step; a fourth step of outputting a correction instruction signal when an absolute value of either the first time-average value and the second time-average value in the third step exceeds an allowable drop; a fifth step of correcting the time-average value of the time-average value which drops in absolute value so that the drop becomes not more than an allowable drop when receiving the correction instruction signal in the fourth step; a sixth step of executing processing which uses the first time-average value and the second time-average value corrected in the fifth step as the basis to detect the state of the light source or the object; and a seventh step of detecting the state of the light source or the object in accordance with the processing value in the sixth step.

A smoke sensor of the present invention has an image capturing unit which captures an image; at least one light source which is set to face the image capturing unit within a capturing range of the image capturing unit and which has a luminance changing by a period of a predetermined multiple of a scanning plane period of the image capturing unit; and a signal processing unit which outputs a detection signal which indicates detection of smoke in a case where the image capturing unit captures an image of the light source and detects a change of level of the output signal which is output in accordance with the light quantity of the light source and the output signal level is outside of the defined range, wherein the signal processing unit has a pre-processing unit which acquires the output signal for each predetermined scanning plane period, calculates a first time-average value of the output signal level difference between the m-th and (m+2)th scanning planes, and calculates a second time-average value of the output signal level difference between the (m+1)th and (m+3)th scanning planes, a post-processing unit which executes processing which uses the first time-average value and the second time-average value calculated by the pre-processing unit as the basis to detect the state of the light source, a detection unit which detects the state of the light source in accordance with the processing value of the post-processing unit, and a correction instruction unit which outputs a correction instruction signal when the absolute value of either the first time-average value and the second time-average value of the pre-processing unit exceeds an allowable drop, wherein the post-processing unit corrects the time-average value of the time-average value which drops in absolute value so that the drop becomes the allowable drop or less and executes the processing when receiving the correction instruction signal of the correction instruction unit.

Advantageous Effect of Invention

According to the present invention, a light source to be captured or an object illuminated by that light source can be detected with a high precision, and the imaging target can be clearly captured.

BRIEF DESCRIPTION OF DRAWINGS

FIG. 10 is a view showing a concrete example of a conversion value table according to the first embodiment of the present invention.

FIGS. 18(A) to 18(C) are schematic views showing concrete examples of a moving object with movement.

DESCRIPTION OF EMBODIMENTS

Below, embodiments of the present invention will be explained with reference to the attached drawings.

First Embodiment

[Example of Configuration of Detection System 10]

Figure 1:
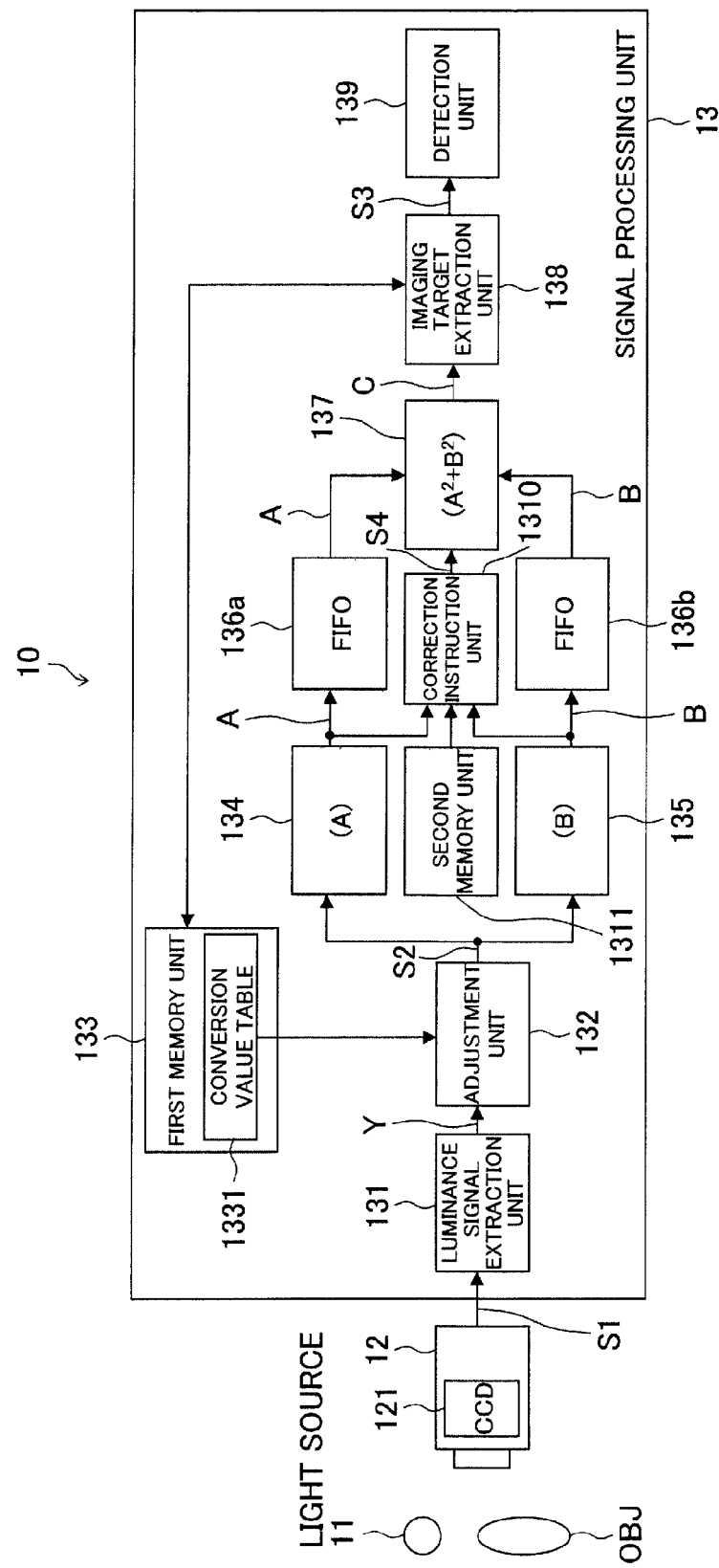
FIG. 1 is a general block diagram showing an example of the configuration of a detection system according to a first embodiment of the present invention.

FIG. 1 is a general block diagram showing an example of the configuration of a detection system according to a first embodiment of the present invention.

As shown in FIG. 1, a detection system 10 has a light source 11, image capturing unit 12, and signal processing unit 13.

The signal processing unit 13 has a luminance signal extraction unit 131, adjustment unit 132, first memory unit 133, first processing unit 134, second processing unit 135, FIFO (First-In First-Out) 136a, FIFO 136b, third processing unit 137, imaging target extraction unit 138, detection unit 139, correction instruction unit 1310, and second memory unit 1311.

The detection system 10 detects the light source 11 to be captured and an object OBJ to be captured which was illuminated by the light source 11 and clearly captures the imaging target. As the characteristic feature of the present embodiment, even if there is an unnecessary moving object having motion other than the object OBJ, the detection system 10 eliminates the picture of this moving object to provide image data obtained by capturing the imaging target.

The light source 11 is configured by for example LEDs (light emitting diodes). The light source 11 illuminates the object OBJ. Its luminance changes (flickers) by a period of 4n (n=1, 2, . . . ) times the field period of the image capturing unit 12.

The image capturing unit 12 is configured by an imaging element, for example, a solid imaging element constituted by a CCD 121. The CCD 121 has, for example, a single-chip complementary filter and performs field storage mode interline transfer.

The image capturing unit 12 captures an image of the light source 11 and the object OBJ illuminated by the light source 11 and generates an analog signal (color signal) in accordance with a light reception amount by photoelectric conversion. Then, the image capturing unit 12 converts an analog imaging signal to a digital imaging signal (AD conversion) by an AD (analog-to-digital) converter, then outputs this digital imaging signal as an imaging signal S1 to the luminance signal extraction unit 131 of the signal processing unit 13.

Note that, in the present embodiment, the television system is the NTSC (National Television System Committee) system, and the scanning system is the interlace system. In this case, the horizontal frequency is 15.734 kHz, and the field frequency (vertical frequency) is 59.94 Hz.

The signal processing unit 13 performs the following signal processing for each field when the imaging signal S1 is input from the image capturing unit 12.

The luminance signal extraction unit 131 extracts a luminance signal of the imaging signal S1 which is input from the image capturing unit 12. The luminance signal extraction unit 131 outputs the extracted luminance signal Y to the adjustment unit 132.

The adjustment unit 132 has a validating mode which validates the adjustment of the signal level of the luminance signal Y and an invalidating mode which invalidates the adjustment of this signal level.

In the validating mode, the adjustment unit 132 adjusts the signal level of the luminance signal Y which is input from the luminance signal extraction unit 131 so that the processing does not break down due to an overflow in processing in the first processing unit 134, second processing unit 135, and third processing unit 137 and outputs a luminance signal S2 which is adjusted in signal level to the first processing unit 134 and second processing unit 135.

In the invalidating mode, the adjustment unit 132 does not adjust the signal level of the luminance signal Y, but outputs this as the luminance signal S2 to the first processing unit 134 and second processing unit 135.

The first memory unit 133 is configured by for example a nonvolatile memory device or random accessible memory device. In the first memory unit 133, a conversion value table 1331 referred to by the adjustment unit 132 is stored.

The first processing unit 134, when receiving as input the luminance signal S2 from the adjustment unit 132, calculates a time-average $(Y_{m+2}-Y_m)T$ of difference between a luminance signal level $Y_m$ in an m (m=1, 2, . . . )th field and a luminance signal level $Y_{m+2}$ in an (m+2)th field apart from the former by 2 fields in units of pixels in the same pixel region. The first processing unit 134 outputs this time average as processing results A to the FIFO 136a and correction instruction unit 1310.

The second processing unit 135, when receiving as input the luminance signal S2 from the adjustment unit 132, calculates a time-average $(Y_{m+3}-Y_{m+1})/T$ of difference between the luminance signal level $Y_{m+1}$ in the (m+1)th field and a luminance signal level $Y_{m+3}$ in an (m+3)th field apart from the former by 2 fields in units of pixels in the same pixel region. The second processing unit 135 outputs this time average as processing results B to the FIFO 136b and correction instruction unit 1310.

The FIFO 136a and FIFO 136b operate in frame synchronization with each other.

The FIFO 136a stores 1 frame's worth of the processing results A for each pixel input from the first processing unit 134 in order of input.

The FIFO 136b stores 1 frame's worth of the processing results B for each pixel input from the second processing unit 135 in order of input.

The FIFO 136a outputs the processing results A in order to the third processing unit 137, while the FIFO 136b outputs the processing results B in order to the third processing unit 137.

Note that, the stored contents of the FIFO 136a and FIFO 136b are cleared at predetermined timings.

The third processing unit 137, when receiving as input the processing results A from the FIFO 136a and processing results B from the FIFO 136b, calculates the sum of a square of the processing results A and a square of the processing results B, that is, SUM ($=A^2+B^2$), in units of pixels. In more detail, the SUM is the sum of a square of a time-average $S_{AC}$ and a square of a time-average $S_{BD}$, that is, SUM ($=S_{AC}^2 + S_{BD}^2$), as will be explained later.

Note, the third processing unit 137 corrects either processing results of the processing results A and processing results B when receiving a correction instruction signal S4 of a "high" level output by the correction instruction unit 1310, then calculates the SUM. This correction will be explained later.

The third processing unit 137 outputs this SUM as the processing results C to the imaging target extraction unit 138.

The imaging target extraction unit 138 extracts the processing results according to the luminance signal component of the imaging target from the processing results C input from the third processing unit 137 and eliminates processing results other than that as noise.

First, the imaging target extraction unit 138 extracts the SUM ($=A^2+B^2$) based on the luminance signal component obtained by capturing images of the light source 11 and object OBJ.

Next, the imaging target extraction unit 138 computes the inter-frame difference and extracts the SUM of pixels not having any difference, that is, pixels having no difference between frames. The imaging target extraction unit 138 outputs the extracted results to the detection unit 139 as processing results obtained by processing based on the luminance signal components of the light source 11 and the object OBJ, that is, the extraction results S3.

In other words, the imaging target extraction unit 138 eliminates the processing results of the luminance signal component of a moving object which is not required when there is a moving object having motion other than the object OBJ.

The detection unit 139, when receiving as input the extraction results S3 from the imaging target extraction unit 138, detects the state of the imaging target, that is, what the imaging target based on this is. Specifically, the detection unit 139 detects that the imaging target is the light source 11 or the object OBJ illuminated by the light source 11.

The detection result of the detection unit 139 is input to a not shown image processing apparatus, whereby a captured image in which the detected imaging target is projected is generated.

In this regard, as explained above, the luminance of the light source 11 changes by a period of 4n times the field period of the image capturing unit 12. The flicker frequency of the light source and the scanning (field) frequency of the image capturing unit 12 are asynchronous.

Figure 2:
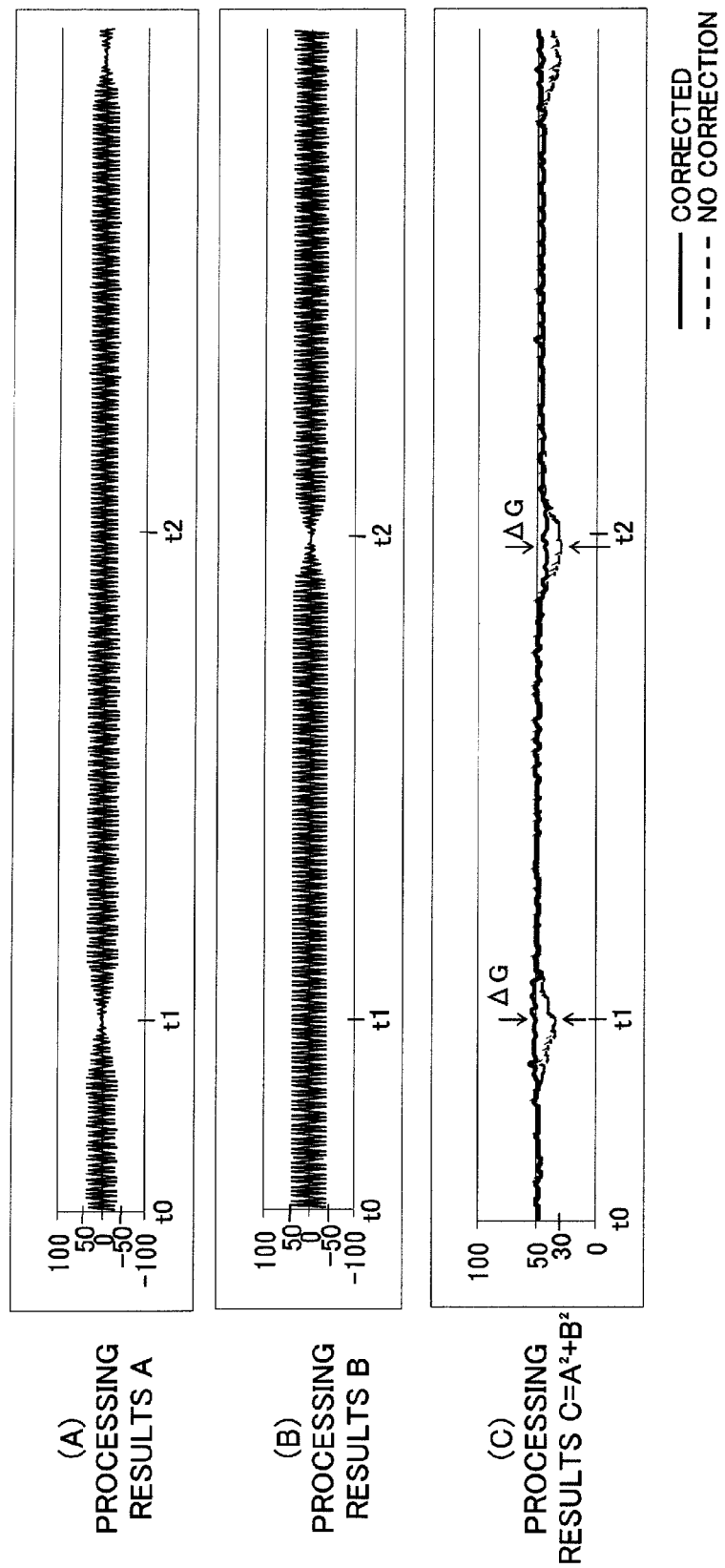
FIGS. 2(A) to 2(C) are views for explaining the function of a correction instruction unit according to the first embodiment of the present invention.

Accordingly, if deviation arises between the flicker frequency and the scanning frequency (hereinafter, simply referred to as "deviation of frequencies") due to the effect of jitter etc. which occurred in the image capturing unit 12 or signal processing unit 13, values of the processing results A and processing results B are apt to converge to 0 or values which are infinitely close to 0 in cycles different from each other. This state will be explained with reference to FIG. 2.

FIGS. 2(A) to 2(c) are views for explaining the functions (processing content) of the correction instruction unit according to the first embodiment of the present invention. FIG. 2(A) shows an example of the processing results A, FIG. 2(B) shows an example of the processing results B, and FIG. 2(C) shows an example of the processing results C.

In FIGS. 2(A) to 2(C), the ordinates show values of the processing results A to C, and the abscissas show times.

FIGS. 2(A) and 2(B) show examples of the processing results A and processing results B in, for example, a case where a light emitting frequency of the light source 11 is made 15 Hz and the field frequency of the image capturing unit 12 is made 60 Hz. The processing results A and processing results B are time averages of luminance signal level differences between two fields (see Equation (8) and Equation (9)). Values which change within a range of for example about −50 to 50 are employed as those values until the time t1.

In FIG. 2(C), the solid line shows the processing results C obtained by calculation and correction by using the processing results A and B, while the broken line shows the processing results C calculated by using the processing results A and B without performing correction.

When there is a deviation of frequency between the light emitting frequency of the light source 11 and the field frequency of the image capturing unit 12, as shown in FIG. 2(A), for example, the value of the processing results A converges infinitely close to 0 in the vicinity of the time t1.

As shown in FIG. 2(B), the time t2 is delayed by about ¼ of the period relative to the time t1 when viewed by the cycles where the value converges infinitely close to 0 due to deviation of the frequencies.

As shown in FIG. 2(C), all processing results C take positive values since they are calculated by $A^2+B^2$. Note, FIG. 2(C) shows values in a case where a square root of the processing results C ($=SUM=A^2+B^2$) is employed.

If the processing results C are calculated by using the processing results A and processing results B as they are, as indicated by the broken line in FIG. 2(C), in the vicinity of the time t1 and time t2, locally small values compared with the processing results C at the other times are taken.

In more detail, as shown in FIG. 2(C), the processing results C take a value of approximately 50 around the time t0. However, when there is a deviation of frequencies in the vicinities of the time t1 and the time t2, the value of the processing results C falls to approximately 30.

This is because, when calculating $SUM=A^2+B^2$, the SUM becomes $C \approx 0^2+B^2=B^2$ when the processing results A are infinitely close to 0 ($A \approx 0$), and the SUM becomes $C \approx A^2+0^2=A^2$ when the processing result B are infinitely close to 0 ($B \approx 0$).

For this reason, a local gap $\Delta G$ is generated between the value of the processing results C in the vicinity of the time t1 or time t2 and the value at the other time.

The gap $\Delta G$ is cyclically generated. For example, when the light source 11 is configured so that its light emitting frequency becomes 15 Hz by building in a 4 MHz quartz vibrator and using a programmable microcomputer (so-called PIC microcomputer), the gap $\Delta G$ is generated in an approximately 13 second period.

Note, the processing performed by the second processing unit 135 on the luminance signal S2 is carried out with a delay of approximately ¼ of the period (delay of $\pi/2$ in phase) relative to the processing performed by the first processing unit 134 on the luminance signal S2, therefore the processing results A and the processing results B do not simultaneously converge to 0 or values infinitely close to 0. This is because the luminance of the light source 11 changes by a period of 4n times the field period of the image capturing unit 12.

When deviation of frequencies occurs, the gap $\Delta G$ is generated, and there is a possibility of erroneous detection of the object OBJ in the detection unit 139. In this case, the finally obtained captured image becomes unclear.

Because the light emitting frequency of the light source 11 and the scanning frequency of the image capturing unit 12 are asynchronous, it is difficult to avoid such deviation of frequencies itself. However, it is possible to correct the value of the processing results A or processing results B so as to eliminate the gap $\Delta G$, that is, obtain the processing results C indicated by the solid line in FIG. 2(C).

Specifically, as shown in FIGS. 2(A) to 2(C), in the vicinity of the time t1, the value of the processing results A is smaller than the value of the processing results B. Accordingly, if the value of the processing results A is the same level as the value of the processing results B, at the stage of calculation of the processing results C, the generation of the gap $\Delta G$ can be prevented.

In the same way, in the vicinity of the time t2, the value of the processing results B is smaller than the value of the processing results A. Accordingly, if the value of the processing results B is the same level as the value of the processing results A, at the stage of calculation of the processing results C, the generation of the gap ΔG can be suppressed.

Therefore, the correction instruction unit 1310 monitors the processing results A input from the first processing unit 134 and the processing results B input from the second processing unit 135 and, when the value of the processing results A or processing results B converges to 0 or a value infinitely close to 0, outputs a high level correction instruction signal S4 instructing the correction of this value to the third processing unit 137.

The third processing unit 137, when receiving the high level correction instruction signal S4, corrects the processing results A or processing results B so as to become the processing results C indicated by the solid line in FIG. 2(C), then calculates the SUM.

The second memory unit 1311 is configured by for example a nonvolatile memory device or random accessible memory device. In the second memory unit 1311, the correction data referred to by the correction instruction unit 1310 is stored. This correction data is the data concerning the later explained allowable quantity α.

[Details of CCD 121]

The structure of the CCD 121 will be explained with reference to FIG. 3.

Figure 3:
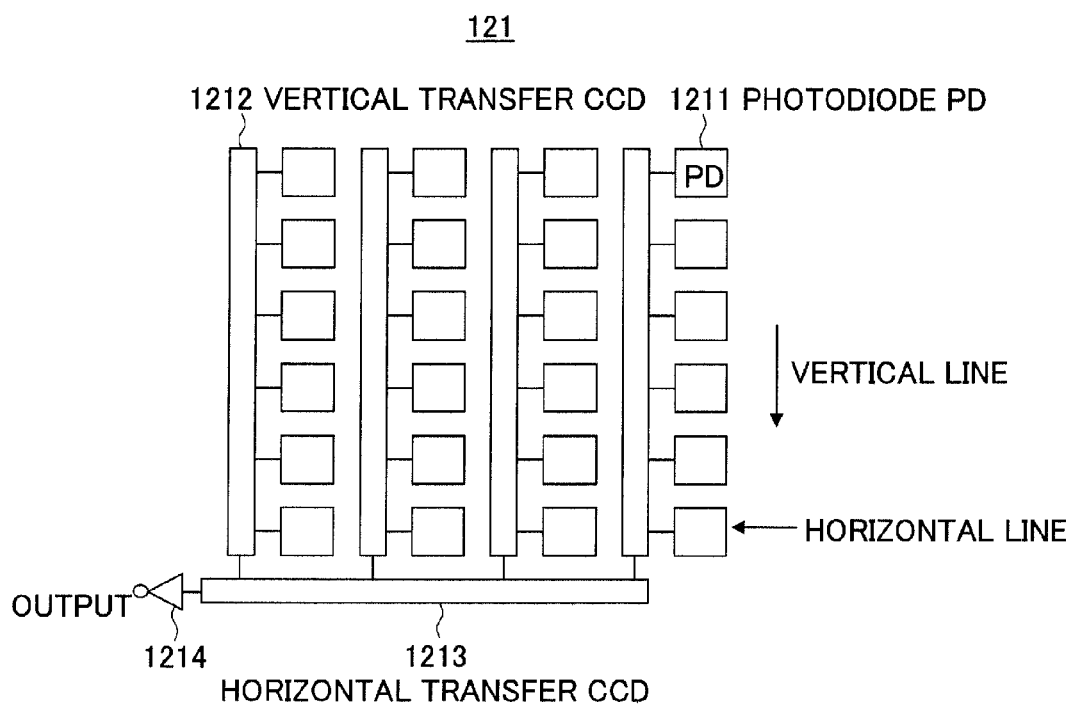
FIG. 3 is a general schematic view for explaining the structure of a CCD according to the first embodiment of the present invention.

FIG. 3 is a general schematic view for explaining the structure of the CCD according to the first embodiment of the present invention.

The CCD 121 has a plurality of photodiodes (PD) 1211, a plurality of vertical transfer CCDs 1212, a horizontal transfer CCD 1213, and an amplifier 1214.

The photodiodes 1211 are aligned in a matrix in the pixel region. The photodiodes 1211 aligned in the vertical line direction are individually connected to the vertical transfer CCDs 1212 for transferring charges for each column. One end of each vertical transfer CCD 1212 is connected to the horizontal transfer CCD 1213 for transferring charges to the amplifier 1214. To the output side of the horizontal transfer CCD 1213, the amplifier 1214 is connected.

In the interlace system, one frame (one screen) is comprised of an odd field and an even field.

When the light emitted by the light source 11 strikes the photodiodes 1211, the photodiodes 1211 transform the light to electric charges by photoelectric conversion and store the charges during the charge storage time. During this time, the photodiodes 1211 and the vertical transfer CCDs 1212 are electrically cut off by gates.

After the end of the charge storage time, the gates become ON, the photodiodes 1211 and the vertical transfer CCD 1212 become conductive, and charges stored in the photodiodes 1211 in the vertical direction (column direction) are transferred to the corresponding vertical transfer CCDs 1212. Immediately after this, the gates become OFF, the photodiodes 1211 and the vertical transfer CCDs 1212 are cut off, and the photodiodes 1211 start the next storage of charges.

The charges transferred to the vertical transfer CCDs 1212 are transferred for each horizontal line to the horizontal transfer CCD 1213 at a horizontal scanning frequency of 15.734 kHz.

The amplifier 1214 amplifies charges from the horizontal transfer CCD 1213 and outputs these to an AD converter (not shown) etc. A signal converted to a digital signal by the AD converter etc. is output as the imaging signal S1 to the signal processing unit 13.

Figure 4:
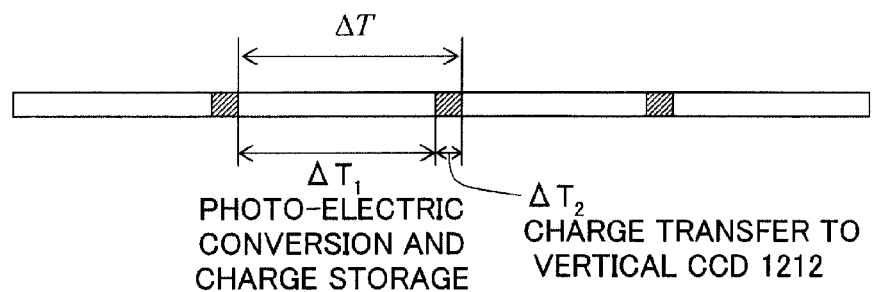
FIG. 4 is a view for explaining a time sequence of a CCD 121 shown in FIG. 3.

FIG. 4 is a view for explaining the time sequence of the CCD 121 shown in FIG. 3.

A charge storage time from the start to the end of the storage of charges by the photodiodes 1211 is defined as ΔT1.

Further, a transfer time until the transfer of charges from the photodiodes 1211 to the vertical transfer CCDs 1212 is defined as ΔT2.

Light energy incident upon the CCD 121 is cumulatively added in the photodiodes 1211 during the charge storage time ΔT1 and is transferred to the vertical transfer CCDs 1212 in the transfer period ΔT2, therefore the charge storage time ΔT becomes equal to ΔT1+ΔT2. In the present embodiment, ΔT=1/59.9≠16.695 (milliseconds).

[Details of Luminance Signal Extraction Unit 131]

The signal processing unit 13 will be explained in detail next. First, the luminance signal extraction unit 131 will be explained with reference to the CCD 121.

Figures 5, 6:
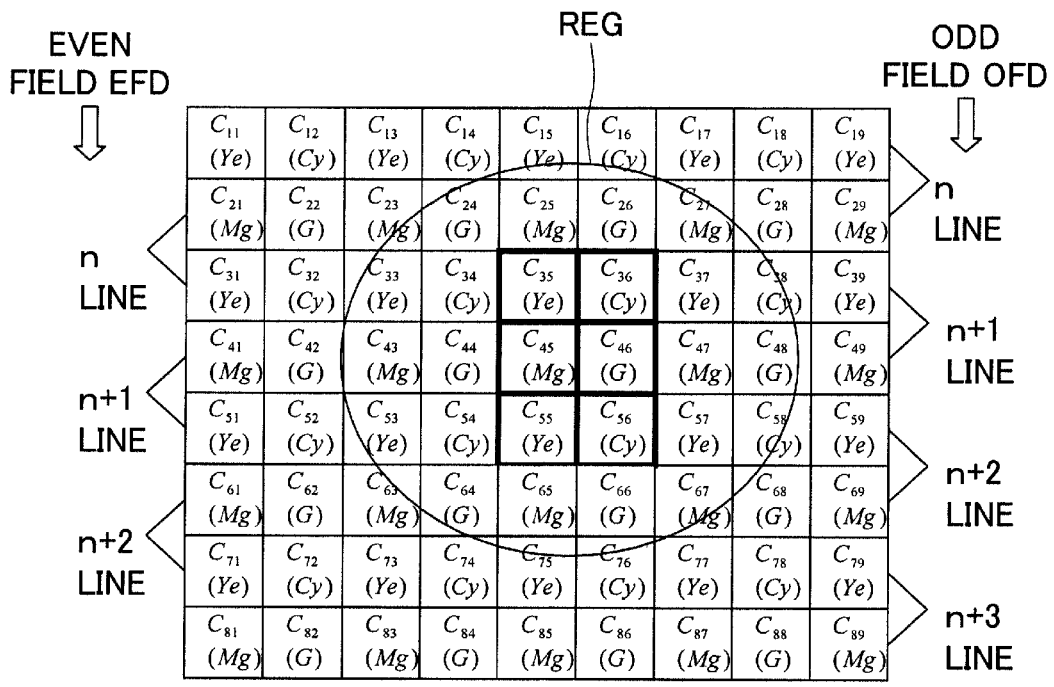
FIG. 5 is a view of an example showing an arrangement of colors of a single-chip complementary filter.
FIG. 6 is a view showing examples of combinations of color signals in an odd field OFD and an even field EFD.

FIG. 5 is a view of an example showing the arrangement of colors of a single-chip complementary filter. FIG. 5 shows a portion of the pixel region. $C_{m,n}$ in the figure shows the arrangement of pixels in a two-dimensional state (M indicates a row, and N indicates a column).

FIG. 6 is a view showing examples of combinations of color signals in the odd field OFD and the even field EFD.

The single-chip complementary filter is configured by four types of color filters. In more detail, as shown in FIG. 5, in the single-chip complementary filter, Ye (yellow), Cy (cyan), Mg (magenta), and G (green) color filters are aligned in a Bayer type arrangement.

At the time of reading out pixel signals, upper and lower pixel signals added together are read out as a color signal. Combinations of addition are shifted by one column between the odd field OFD and the even field EFD.

Specifically, in the n lines of the odd field OFD, two pixels adjacent in the vertical direction, i.e., the pixels ($C_{1,1}+C_{2,1}$), pixels ($C_{1,2}+C_{2,2}$), pixels ($C_{1,3}+C_{2,3}$), pixels ($C_{1,4}+C_{2,4}$), pixels ($C_{1,5}+C_{2,5}$), . . . are combined.

In the n lines of the even field EFD, upper and lower pixels such as the pixels ($C_{2,1}+C_{3,1}$), pixels ($C_{2,2}+C_{3,2}$), pixels ($C_{2,3}+C_{3,3}$), pixels ($C_{2,4}+C_{3,4}$), pixels ($C_{2,5}+C_{3,5}$), . . . are combined.

As shown in FIG. 6, in the odd field OFD, the color signals are read out in the combinations of pixels explained above. In the even field EFD as well, the color signals are read out in the combination of pixels explained above.

In both the odd and even fields, a color pattern of a combination of (Ye, Cy, Mg, G) is repeated by a period (unit) of 2 pixels. The color signal appears while superposed on a frequency of a 2-pixel period or more.

Therefore, the luminance signal extraction unit 131 inputs this color signal to a low pass filter (not shown) using the 2-pixel period as the cut-off frequency and extracts the luminance signal Y. That is, the luminance signal Y is sampled by a 2-pixel period.

In FIG. 5, a projection region REG shown by a circle is a region to which the light of the light source 11 is projected. It is assumed that the pixels $C_{3,5}$, $C_{3,6}$, $C_{4,5}$, $C_{4,6}$, $C_{5,5}$, and $C_{5,6}$ are completely included in the projection region REG and that the light is uniformly emitted.

In this case, in the odd field OFD, the color signals are read out by the combination of pixels $C_{3,5}$, $C_{3,6}$, $C_{4,5}$, and $C_{4,6}$.

On the other hand, in the even field EFD, the color signals are read out by the combination of pixels $C_{4,5}$, $C_{4,6}$, $C_{5,5}$, and $C_{5,6}$.

[Details of Adjustment Unit 132]

The adjustment unit 132 will be explained with reference to FIG. 7 to FIG. 11.

Figure 7:
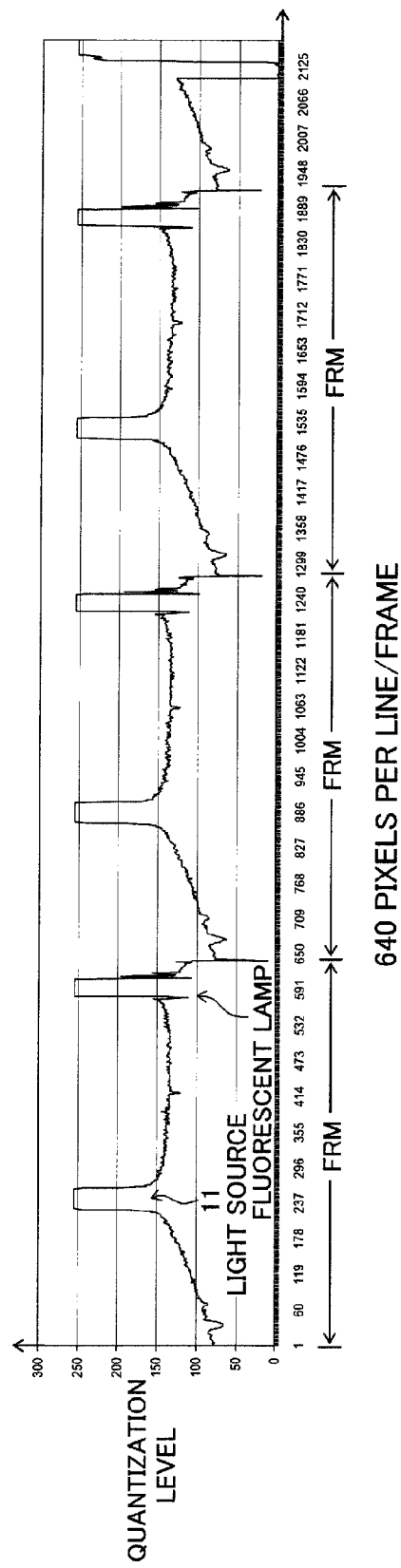
FIG. 7 is a view showing an example of a luminance signal extracted by a luminance signal extraction unit according to the first embodiment of the present invention.

FIG. 7 is a view showing an example of the luminance signal extracted by the luminance signal extraction unit according to the first embodiment of the present invention. The ordinate shows the quantization level of the luminance signal Y, while the abscissa shows 640 pixels per line (scanning line) repeated for each frame FRM.

As previously explained, the image capturing unit 12 converts the color signal output by the CCD 121 to a digital signal. At this time, if a resolution of the AD converter is 8 bits, the color signal is quantized (digitalized) from 0 to 255 data.

For example, when the light source 11 is captured under a lit fluorescent lamp, the image capturing unit 12 outputs the quantized color signal as the imaging signal S1 to the luminance signal extraction unit 131. Then, the luminance signal extraction unit 131 runs this imaging signal S1 through the low pass filter explained above and extracts the luminance signal Y as shown in FIG. 7.

FIG. 7 shows a luminance signal Y in three successive frames FRM. In the n lines of each frame FRM, the luminance signal Y around the pixel $C_{n,237}$ shows the signal by the light source 11, while the luminance signal Y around the pixel $C_{n,591}$ shows the signal by the fluorescent lamp.

The light source 11 and the fluorescent lamp have higher luminances than those of the other imaging targets. For this reason, as shown in FIG. 7, for example, the quantization level around the pixel $C_{n,237}$ takes the value of 255, while the quantization level around the pixel $C_{n,597}$ takes the value of 255 as well.

In this way, when the luminance signal Y is expressed by 8 bits of data, the value of "255" is the maximum value of the quantized luminance signal level. However, this is not always the maximum value of the original luminance signal level. In other words, there is a possibility of existence of the maximum value of the luminance signal level at a position exceeding the resolution of the AD conversion.

Details of the processing will be explained later. The first processing unit 134 calculate the time average $S_{AC}$, the second processing unit 135 calculates the time average $S_{BD}$, and the third processing unit 137 calculates the SUM=$S_{AC}^2$+$S_{BD}^2$.

These processing are basically integration. In addition, particularly, the third processing unit 137 executes processing of a sum of squares. For this reason, if the maximum value of the luminance signal level is not within the range of the resolution of the AD conversion, the maximum value of the processing result is not kept within "255", but causes overflow, so the processing sometimes cannot be executed.

Therefore, the adjustment unit 132 adjusts the luminance signal level so that the maximum value of the original luminance signal level is kept within the range of values from 0 to 255. Due to this, the overflow by the reason explained above can be suppressed.

Figures 8, 9:
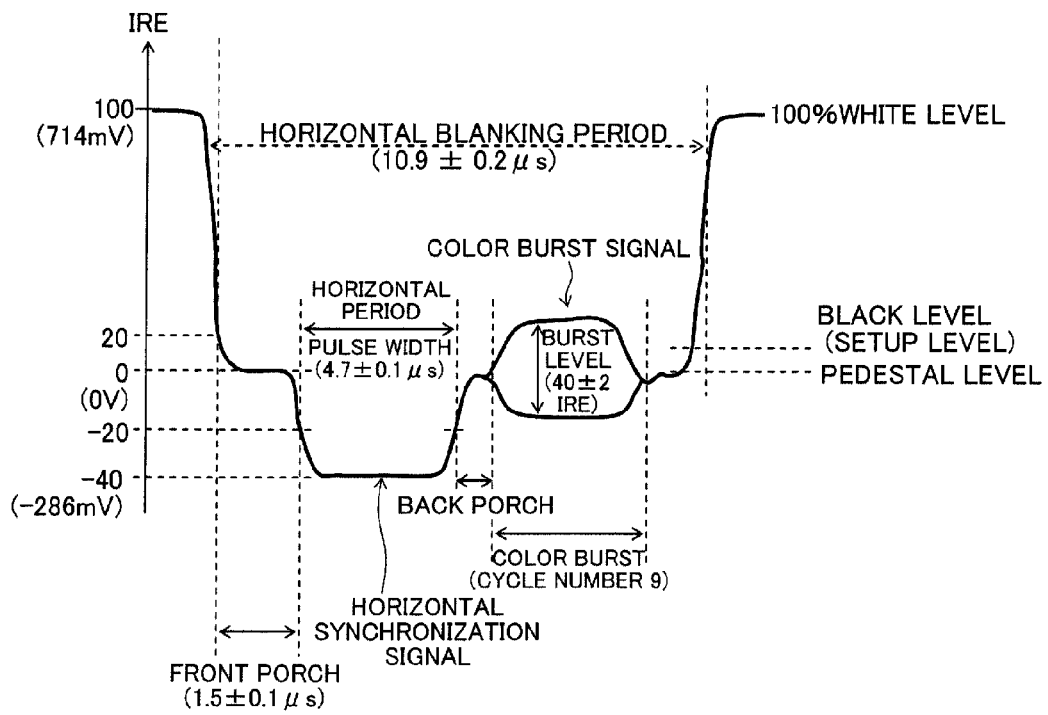
FIG. 8 is a view showing a horizontal blanking period according to the RS-170A standard.
FIG. 9 is a view showing coding parameters of a luminance signal according to the RS-170A standard.

In this regard, in the NTSC system, the luminance signal levels, code parameters of luminance signals, etc. are determined according to the RS-170A standard as shown in FIG. 8 and FIG. 9.

FIG. 8 is a view showing a horizontal blanking period according to the RS-170A standard.

FIG. 9 is a view showing coding parameters of luminance signals according to the RS-170A standard.

In FIG. 8, the horizontal blanking period is exemplified for explaining the luminance signal level.

The unit of the signal level (DC voltage value), IRE, represents a relative value when designating a white level as 100(%). Note that, when designating 140IRE=1$V_{PP}$, the white level is 100IRE=714 mV.

As shown in FIG. 8, after trailing edge of the horizontal blanking, a "front porch" is set. The signal level at this front porch is called a "pedestal level". The pedestal level is set as the reference (0IRE) of the luminance signal level in Japan.

After the front porch, a horizontal synchronization signal determining the timing of scanning is output. The horizontal synchronization signal level is −40IRE=−286 mV. After the "back porch", a color burst signal which becomes the reference for the color phase is output. Before the start of scanning, the signal level is set to a "black level". The black level is called as a setup level as well and is 0IRE in Japan.

Such a luminance signal is quantized according to the coding parameters shown in FIG. 9. When the resolution of the AD conversion is 8 bits, the quantization level of the blanking level is 60 ("3Ch" in hexadecimal notation), while the quantization level of the white level is 200 (C8h in hexadecimal notation).

Note that, the blanking level is equal to the black level (setup level). FIG. 9 shows the sampling frequency, valid sample number, etc. as well.

The luminance signal Y is a signal extracted based on the imaging signal S1 obtained by AD converting the color signal as it is. Accordingly, in order to keep the maximum value of the original luminance signal level within the range of values from 0 to 255, the adjustment may be carried out so that the maximum value of the luminance signal level becomes not more than 200 of the white level (100IRE). Further, the adjustment may be carried out so that the minimum value of the luminance signal level becomes 60 of the black level (0IRE).

Specifically, the adjustment unit 132 refers to the conversion value table 1331 stored in the first memory unit 133 and multiplies the luminance signal Y input from the luminance signal extraction unit 131 by a conversion value Lu in unit of pixels in accordance with the mode.

A concrete example of the conversion value table 1331 will be explained with reference to FIG. 10.

FIG. 10 is a view showing a concrete example of the conversion value table according to the first embodiment of the present invention.

As shown in FIG. 10, in the conversion value table 1331, the conversion values are linked with the modes.

In the invalidating mode, the conversion value Lu is equal to 1.

In the validating mode, the suppression level of overflow is variable, and a conversion value is linked with each suppression level. For example, at a suppression level L1, the conversion value Lu is equal to 0.703. At a suppression level L2, the conversion value Lu is equal to 0.625. At a suppression level L3, the conversion value Lu is equal to 0.546.

These conversion values Lu are values which can be adjusted so that the luminance signal level becomes 60 of the black level (0IRE) to 200 of the white level (100IRE) (60≤luminance signal level≤200).

Note, preferably a luminance signal component of the pedestal level or less is not contained. In this case, the luminance signal level is 0 to 140 (0≤luminance signal level≤140).

For example, each conversion value Lu can be found as follows.

The third processing unit 137 performs the processing of SUM=$A^2+B^2$. If the resolution of the A/D conversion is 8 bits (256 gradations), the processing results A and B must be values such that $(A^2+B^2)^{1/2} \leq 255$ stands.

In this case, desirably the processing results A≤180, while desirably the processing results B≤180.

If both of the values of the processing results A and B are 181, the value of $(A^2+B^2)^{1/2}$ exceeds 255, therefore overflow occurs. If the maximum value of the processing results A or processing results B is 140, the value of $(A^2+B^2)^{1/2}$ is kept at an extent of 179.989, therefore overflow will not occur.

If the maximum value of either of the processing results A or processing results B is 180, the conversion value Lu at the suppression level L1 is found as Lu=180/256≈0.703.

In the same way, if this maximum value is 160, the conversion value Lu at the suppression level L2 is found as Lu=160/256≈0.625.

If this maximum value is 140, the conversion value Lu at the suppression level L3 is found as Lu=140/256≈0.546.

Further, it is also possible to provide a plurality of suppression levels and make the value of the conversion value Lu become smaller as the suppression level rises.

Below, the luminance signal level corresponding to the pixel $C_{m,n}$ will be suitably expressed as $Y_{m,n}$. This being the case, the processing of multiplying the luminance signal Y by the conversion value Lu in units of pixels can be expressed as $Y^*_{m,n}=Y_{m,n} \times Lu$.

The adjustment unit 132 performs such processing for each frame in units of pixels and outputs the processing value $Y^*_{m,n}$ as the luminance signal S2 to the first processing unit 134 and second processing unit 135.

In the invalidating mode, the conversion value Lu is equal to 1, therefore the processing value $Y^*_{m,n}$ is the same as the luminance signal level $Y_{m,n}$. That is, this means suspension of the adjustment of the luminance signal level.

In the validating mode, the value of the conversion value Lu is smaller than 1, therefore the processing value $Y^*_{m,n}$ becomes a value smaller than the original luminance signal level $Y_{m,n}$. Further, the higher the suppression level, the smaller the processing value $Y^*_{m,n}$.

Figure 11:
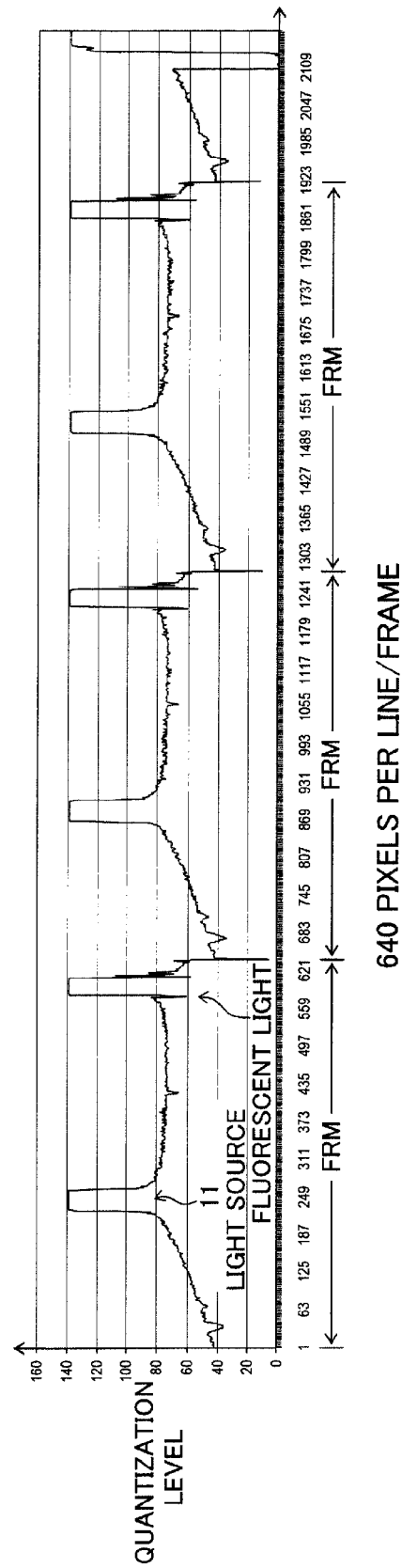
FIG. 11 is a view showing an example of a luminance signal adjusted in signal level by an adjustment unit according to the first embodiment of the present invention.

A concrete example of the processing value $Y^*_{m,n}$ at the suppression level L3 is shown in FIG. 11.

FIG. 11 is a view showing an example of a luminance signal adjusted in the signal level by an adjustment unit according to the first embodiment of the present invention. In FIG. 11 as well, in the same way as FIG. 7, the ordinate shows the quantization level of the luminance signal, while the abscissa shows 640 pixels per line (scanning line) repeated for each frame FRM.

For example, when the maximum value of the luminance signal level $Y_{m,n}$ is 255, the conversion value Lu is equal to 0.546 at the suppression level L3, therefore the processing value $Y^*_{m,n}$ becomes one where $Y^*_{m,n}=255\times0.546\approx139.7$.

At the suppression level L3, the conversion value Lu is approximately equal to 0.5. Therefore, as shown in FIG. 11, the luminance signal level after the signal level adjustment becomes approximately half of the original luminance signal level. For this reason, the maximum value of the luminance signal level is kept to an extent of 140. A width of the blanking level and white level is 140. Note, in FIG. 11, values not more than 0IRE are ignored.

Though illustration is omitted, in the case of the suppression level L2, the value of the conversion value Lu is larger than that at the suppression level L3, therefore the processing value $Y^*_{m,n}$ also becomes a value larger than that at the suppression level L3. In the case of the suppression level L1, the processing value $Y^*_{m,n}$ becomes a value larger than that in the case of the suppression level L2. Naturally, the luminance signal level will not exceed 255.

In this way, by adjustment by the adjustment unit 132 for the luminance signal level so as to lower the signal level, the maximum value of the luminance signal level can be kept in the range of the resolution of the AD conversion. As a result, the first processing unit 134, second processing unit 135, or third processing unit 137 can execute the processing without causing overflow.

Note that, as the suppression level, a level that does not cause an overflow may be preferably selected, for example, based on a broadcast system such as the NTSC system or PAL system, a moving picture format of the MPEG (Moving Picture Experts Group) etc., and the scanning frequency of the image capturing unit 12.

The conversion value Lu can also be determined in accordance with the broadcast format, moving picture format, scanning frequency of the image capturing unit 12, etc. explained above. It is also possible to provide a plurality of suppression levels so that the value of the conversion value Lu approaches 1 as the suppression level rises.

The type of the mode is not limited to the invalidating mode and validating mode and may be suitably modified. For example, it is also possible to provide modes corresponding to the broadcast format, moving picture format, scanning frequency of the image capturing unit 12, and so on and set the conversion value Lu for each mode.

[Details of First Processing Unit 134 and Second Processing Unit 135]

The processing performed in the first processing unit 134 and the second processing unit 135 will be explained next. Note, it is assumed that light is projected to the projection region REG shown in FIG. 5.

FIGS. 12(A) to 12(F) are timing charts for explaining the processing in the first processing unit and second processing unit according to the first embodiment.

Figure 12:
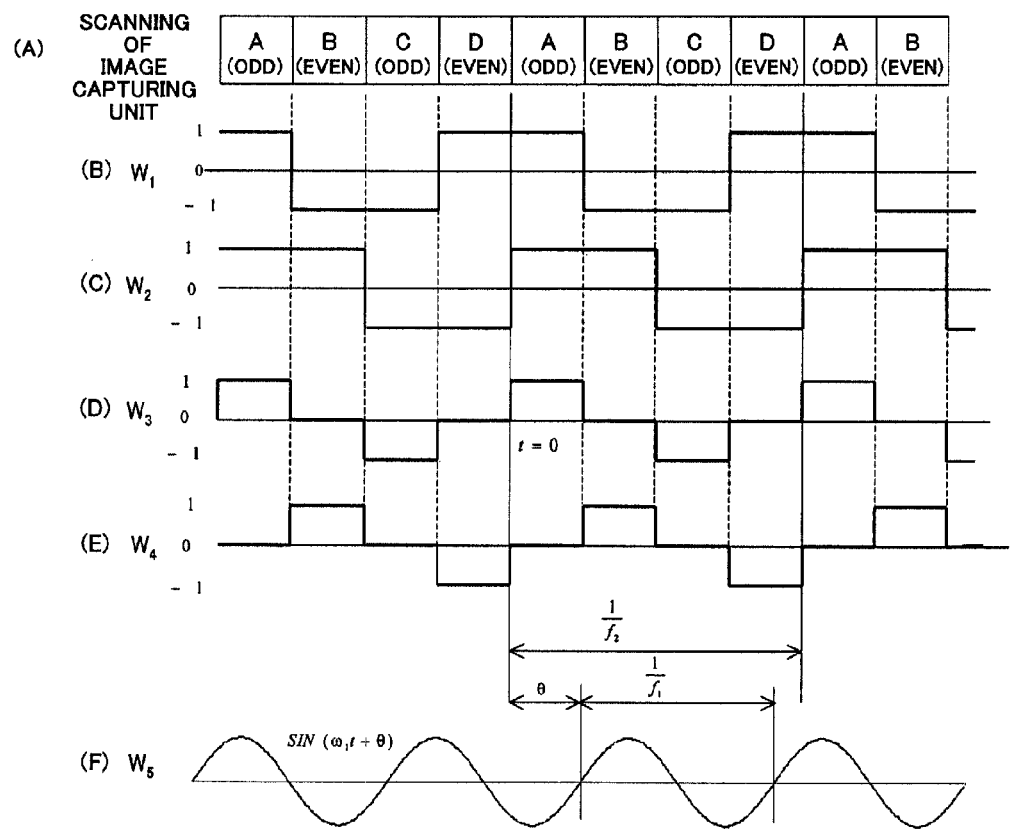
FIGS. 12(A) to 12(F) are timing charts for explaining processing in a first processing unit and second processing unit according to the first embodiment of the present invention.

As shown in FIG. 12(A), after the n-line odd field OFD (A) is scanned, the n-line even field EFD(B) is scanned. Note that, in FIG. 12(A), for example, the n-line odd field OFD(A) is simply expressed as "A(odd)".

As previously explained, 1 frame is comprised of an odd field and an even field, therefore the scanning of 1 frame is completed by the scanning of the odd field OFD(A) and the scanning of the even field EFD(B).

Then, after the n-line odd field OFD(C) is scanned, the n-line even field EFD(D) is scanned. As explained above, the scanning of 1 frame is completed by the scanning of the odd field OFD(C) and the scanning of the even field EFD(D).

Each pixel of the projection region REG receives light emitted by the light source 11 and stores charges for a time period of about 1 field. The charges are read out as RGB signals after the charge storage period.

The image capturing unit 12 applies AD conversion etc. to the analog color signal and outputs this as the imaging signal S1 to the luminance signal extraction unit 131.

After that, the luminance signal extraction unit 131, when receiving as input the imaging signal S1 from the image capturing unit 12, extracts the luminance signal Y from this and outputs the result to the adjustment unit 132. After that, the adjustment unit 132 adjusts the signal level of the luminance signal Y and then outputs the result as the luminance signal S2 to the first processing unit 134 and second processing unit 135.

First, the first processing unit 134 will be explained.

The first processing unit 134 calculates, in the same pixel region, the time average $S_{AC}$ of the difference between the luminance signal level in the m-th odd field OFD(A) and the luminance signal level in the (m+2)th odd field OFD(C).

In particular, in the projection region REG, the time average $S_{AC}$ is calculated from the difference between the luminance signal level of the odd field OFD(A) in the combination of the pixels $C_{3,5}$, $C_{3,6}$, $C_{4,5}$, and $C_{4,6}$ and the luminance signal level of the odd field OFD (C) in the combination of these pixels. Note that, the difference of these luminance signal levels will be referred to as the "luminance level difference AC".

The time average $S_{AC}$ is obtained by taking the time average of multiplication results of the function representing the luminance level difference AC and a function W3 shown in FIG. 12(D). In other words, this luminance level difference AC can be grasped as the change of the light projected to the pixels $C_{3,5}$, $C_{3,6}$, $C_{4,5}$, and $C_{4,6}$ along with the elapse of time.

Here, it is assumed that the function representing the luminance level difference AC, that is, the function representing the change of the light along with the elapse of time, is the simplest function W5 shown in FIG. 12(F).

The function W3 is a function calculated by dividing the sum of the function W1 shown in FIG. 12(B) and the function W2 shown in FIG. 12(C) by 2.

First, the function W1 and function W2 can be represented as in Equations (1) and (2) by using Fourier series.

[Equation 1]

$$W_1 = \frac{4}{\pi}\sum_{n=1}^{\infty}(-1)^{(n-1)}\frac{1}{2n-1}\text{COS}(2n-1)\omega_2 t \quad (1)$$

$$W_2 = \frac{4}{\pi}\sum_{n=1}^{\infty}\frac{1}{2n-1}\text{SIN}(2n-1)\omega_2 t \quad (2)$$

$$\omega_2 = 2\pi f_2 \quad (3)$$

The function W1 shown in Equation (1) is a function using the time t1 and angular velocity $\omega_2$ as variables and is used for deriving the function W3.

The function W2 shown in Equation (2) is a function using the time t1 and angular velocity $\omega_2$ as variables and is used for deriving the function W4 which will be explained later.

Note, the angular velocity $\omega_2$ is common to the function W1 and the function W2 and is represented by the circular constant $\pi$ and frequency $f_2$ as shown in Equation (3).

The function W3 is a function found by dividing the sum of the function W1 and function W2 by 2, therefore can be represented as in Equation (4) by using Equation (1) and Equation (2).

[Equation 2]

$$W_3 = \frac{1}{2}(W_1 + W_2) \quad (4)$$

$$= \frac{2}{\pi}\sum_{n=1}^{\infty}\frac{1}{2n-1}(\text{SIN}(2n-1)\omega_2 t + (-1)^{(n-1)}\text{COS}(2n-1)\omega_2 t)$$

On the other hand, the simplest function W5 representing the change of the light along with the elapse of time can be represented as in Equation (5) by using a sine wave.

[Equation 3]

$$W_5 = A\,\text{SIN}(\omega_1 t + \theta) \quad (5)$$

$$\omega_1 = 2\pi f_1 \quad (6)$$

Note, $f_1$ is the frequency of the sine wave, and $\theta$ is the phase difference of the sine wave. A is the amplitude of the sine wave, that is, the luminance signal level. The angular velocity $\omega_1$ is represented by the circular constant $\pi$ and the frequency $f_1$ as shown in Equation (6).

The product obtained by multiplying the function W3 and the function W5 with each other in order to find the time average $S_{AC}$ can be represented as in Equation (7).

[Equation 4]

$$W_3 \times W_5 = A\frac{2}{\pi}\sum_{n=1}^{\infty}\frac{1}{2n-1}\begin{pmatrix}\text{SIN}(\omega_1 t + \theta)\text{SIN}(2n-1)\omega_2 t + \\ (-1)^{(n-1)}\text{SIN}(\omega_1 t + \theta)\text{COS}(2n-1)\omega_2 t\end{pmatrix} \quad (7)$$

$$= A\frac{1}{\pi}\sum_{n=1}^{\infty}\frac{1}{2n-1}\begin{bmatrix}-\text{COS}\begin{pmatrix}(\omega_1 + (2n-1)\omega_2)t + \theta) + \\ \text{COS}((\omega_1 - (2n-1)\omega_2)t + \theta\end{pmatrix} + \\ (-1)^{(n-1)}((\text{SIN}(\omega_1 + (2n-1)\omega_2)t + \theta) + \\ \text{SIN}((\omega_1 - (2n-1)\omega_2)t + \theta)\end{bmatrix}$$

As explained above, the time average $S_{AC}$ is obtained by taking the time average of multiplication results of the function W3 and the function W5. When taking the time average from the time 0 to the time T by using Equation (7), the term including the time t which is on the right side in Equation (7) is an alternating current signal, therefore the time average of that is 0.

Accordingly, in a case of ($\omega 1-(2n-1)\,\omega 2=0$), a constant $\cos\theta$ and a constant $\sin\theta$ remain. As a result, the time average $S_{AC}$ of the luminance level difference AC is represented by Equation (8).

[Equation 5]

$$S_{AC} = \frac{1}{T}\int_0^T W_3 \times W_5\, dt \quad (8)$$

$$= \frac{A}{\pi(2n-1)}(\text{COS}\theta + \text{SIN}\theta)$$

As shown in Equation (8), the time average $S_{AC}$ is represented by the $\cos\theta$ and $\sin\theta$.

When the luminance level difference AC is represented by the function W5, the first processing unit 134 performs the processing shown in Equation (8) to calculate the time average $S_{AC}$ of the luminance level difference AC.

Next, the second processing unit 135 will be explained.

The second processing unit 135 calculates, in the projection region REG, a time average $S_{BD}$ of the difference between the luminance signal level in the (m+1)th even field EFD (B) and the luminance signal level in the (m+3)th even field EFD(D). Note that, this difference of luminance levels will be referred to as the "luminance level difference BD".

In particular, the time average $S_{BD}$ is calculated from the luminance level difference BD between the even field EFD (B) and the even field EFD (D) by the combination of the pixels $C_{4,5}$, $C_{4,6}$, $C_{5,5}$, and $C_{5,6}$.

The time average $S_{BD}$ is obtained by taking the time average of multiplication results of the function representing the luminance level difference BD and the function W4 shown in FIG. 12(E). This luminance level difference BD can also be grasped as the change of the light projected to the pixels $C_{4,5}$, $C_{4,6}$, $C_{5,5}$, and $C_{5,6}$ along with an elapse of time.

Here, it is also assumed that the function representing the luminance level BD, that is, the function representing the change of the light along with an elapse of time, is the function W5 shown in FIG. 12(F).

The time average $S_{BD}$ is found according to a calculation method the same as that for the time average $S_{AC}$ and is shown by Equation (9).

[Equation 6]

$$S_{BD} = \frac{1}{T}\int_0^T W_4 \times W_5\, dt \quad (9)$$

$$= \frac{A}{\pi(2n-1)}(\cos\theta - \sin\theta)$$

Note that, the function W4 is a function calculated by (W2−W1)/2.

When the luminance level difference is represented by the function W5, the second processing unit 135 performs the processing shown by Equation (9) and calculates the time average $S_{BD}$ of the luminance level difference BD.

Then, the sum of a square of the time average $S_{AC}$ and a square of the time average $S_{BD}$, SUM (=$S_{AC}^2 + S_{BD}^2$), is calculated by the third processing unit 137.

This SUM can be represented as in Equation (10) by using Equation (8) and Equation (9).

[Equation 7]

$$SUM = S_{AC}^2 + S_{BD}^2 \quad (10)$$

$$= 2\left(\frac{A}{\pi(2n-1)}\right)^2 (\cos^2\theta + \sin^2\theta)$$

$$= 2\left(\frac{A}{\pi(2n-1)}\right)^2$$

As shown in Equation (10), the SUM does not depend upon the phase difference 0 of the function W5. When the frequency $f_1$ of the light received at the image capturing unit 12 contains a frequency component such that $f_1$ becomes equal to $(2n-1)f_2$, the detection unit 139 detects the component of the waveform, that is, luminance.

Note that, the SUM shown in Equation (10) is one in a case where a function representing the change of the light along with an elapse of time is a sine wave. Next, a concrete example of the function representing the change of the light along with an elapse of time will be explained.

Figure 13:
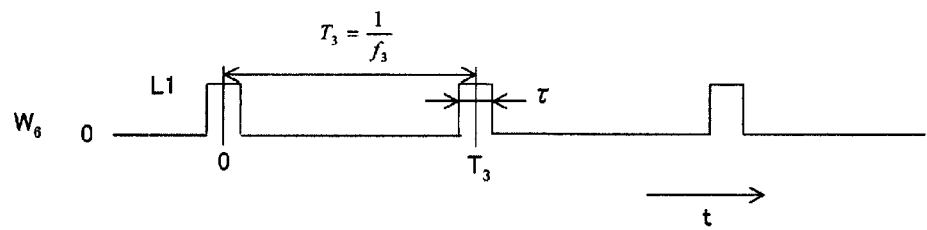
FIG. 13 is a timing chart showing an example of change of the luminance of a light source according to the first embodiment of the present invention.

FIG. 13 is a timing chart showing an example of the change of the luminance of the light source according to the first embodiment of the present invention.

As shown in FIG. 13, the light source 11 changes the luminance for a time τ in a light emitting period T3. Note that, L1 indicates the luminance signal level. For the light emitting period T3, a relationship of T3=1/$f_3$ stands when using the light emitting frequency $f_3$.

The function W6 shown in FIG. 13 can be represented as in Equation (11) by using the general formula E(t) of the Fourier series.

[Formula 8]

$$E(t) = a_0 + \sum_{n=1}^{\infty}(a_n \cos n\omega_3 t + b_n \sin n\omega_3 t) \quad (11)$$

As shown in Formula (11), $a_0$, $a_n$, and $b_n$ are coefficients. For the angular velocity $\omega_3$, a relationship of $\omega_3 = 2\pi f_3$ stands when using the light emitting frequency f3.

The function W6 is a periodic function of the light emitting interval 1/$f_3$, therefore the coefficients $a_0$, $a_n$, and $b_n$ can be represented as in Equation (12) to Equation (14).

[Equation 9]

$$a_0 = \frac{1}{T_3}\int_{-\frac{T_3}{2}}^{\frac{T_3}{2}} E(t)\, dt = \frac{L_1 \tau}{T_3} \quad (12)$$

$$a_n = \frac{2}{T_3}\int_{-\frac{T_3}{2}}^{\frac{T_3}{2}} E(t)\cos n\omega_3 t\, dt \quad (13)$$

$$= \frac{2L_1}{T_3}\int_{-\frac{\tau}{2}}^{\frac{\tau}{2}} \cos n\omega_3 t\, dt$$

$$= \frac{2L_1}{T_3 n\omega_3}[\sin n\omega_3 t]_{-\frac{\tau}{2}}^{\frac{\tau}{2}}$$

$$= \frac{2L_1 \tau}{T_3}\frac{\sin n\omega_3 \tau/2}{n\omega_3 \tau/2}$$

$$b_n = \frac{2}{T_1}\int_{-\frac{T_3}{2}}^{\frac{T_3}{2}} E(t)\sin n\omega_3 t\, dt \quad (14)$$

$$= \frac{2L_1}{T_3}\int_{-\frac{\tau}{2}}^{\frac{\tau}{2}} \sin n\omega_3 t\, dt$$

$$= \frac{2L_1}{T_3 n\omega_3}[-\cos n\omega_3 t]_{-\frac{\tau}{2}}^{\frac{\tau}{2}}$$

$$= 0$$

When using Equation (12) to Equation (14), the function W6 can be represented by the Fourier series shown in Equation (15).

[Equation 10]

$$W_6 = \frac{L_1 \tau}{T_3} + \frac{2L_1 \tau}{T_3}\sum_{n=1}^{\infty}\left(\frac{\sin n\omega_3 \tau/2}{n\omega_3 \tau/2}\cos n\omega_3 t\right) \quad (15)$$

When the luminance level difference AC is represented by the function W6, the first processing unit 134 uses the function W6 shown in Equation (15) in place of the function W5 shown in Equation (5), performs the processing shown by Equation (8), and calculates the time average $S_{AC}$ of the luminance level difference AC.

The first processing unit 134 outputs this time average $S_{AC}$ as the processing results A to the FIFO 136a and correction instruction unit 1310. The processing results A input to the FIFO 136a are output in order to the third processing unit 137.

When the luminance level difference BD is represented by the function W6, the second processing unit 135 performs the processing shown by Equation (9) by using the function W6 shown in Equation (15) in place of the function W5 shown in Equation (5) and calculates the time average $S_{BD}$ of the luminance level difference BD as well.

The second processing unit 135 outputs this time average $S_{BD}$ as the processing results B to the FIFO 136b and correction instruction unit 1310. The processing results B input to the FIFO 136b are output in order to the third processing unit 137 as well.

[Detail of Third Processing Unit 137]

The third processing unit 137 calculates the sum of a square of the time average $S_{AC}$ and a square of the time average $S_{BD}$, that is, SUM (=$S_{AC}^2 + S_{BD}^2$). This will be explained below by explaining a concrete example.

As shown in Equation (15), when the light emitting period T3 of the light source 11 is 4n times the field period, that is, when the light emitting frequency $f_3$ is equal to $f_2$, the frequencies coincide in odd terms in Equation (7) and Equation (15).

As a result, the sum of the square of the time average $S_{AC}$ and the square of the time average $S_{BD}$, that is, SUM, can be represented as in Equation (16).

[Equation 11]

$$SUM = S_{AC}^2 + S_{BD}^2 \quad (16)$$
$$= \sum_{n=1}^{\infty} 2\left(\frac{A_{2n-1}}{\pi(2n-1)}\right)^2$$
$$= 2\left(\frac{2L_1\tau}{\pi T_3}\right)^2 \sum_{n=1}^{\infty} \left[\frac{\text{SIN}(2n-1)\omega_2\tau/2}{(2n-1)^2\omega_2\tau/2}\right]^2$$

The duty ratio D for turning on the light source 11 can be represented as in Equation (17).

[Equation 12]

$$D = \frac{\tau}{T_3} = \frac{\omega_2\tau}{2\pi} \quad (17)$$

Accordingly, the SUM shown in Equation (16) can be represented as in Equation (18) by using Equation (17).

[Equation 13]

$$SUM = S_{AC}^2 + S_{BD}^2 \quad (18)$$
$$= \sum_{n=1}^{\infty} 2\left(\frac{A_{2n-1}}{\pi(2n-1)}\right)^2$$
$$= 2\left(\frac{2L_1\tau}{\pi T_3}\right)^2 \sum_{n=1}^{\infty} \left[\frac{\text{SIN}(2n-1)\omega_2\tau/2}{(2n-1)^2\omega_2\tau/2}\right]^2$$

In this regard, the term on the right side of Equation (18) shown in Equation (19) converges.

[Equation 14]

$$\frac{8}{\pi^4} \sum_{n=1}^{\infty} \left[\frac{\text{SIN}(2n-1)D\pi}{(2n-1)^2}\right]^2 \quad (19)$$

Figures 14, 15:
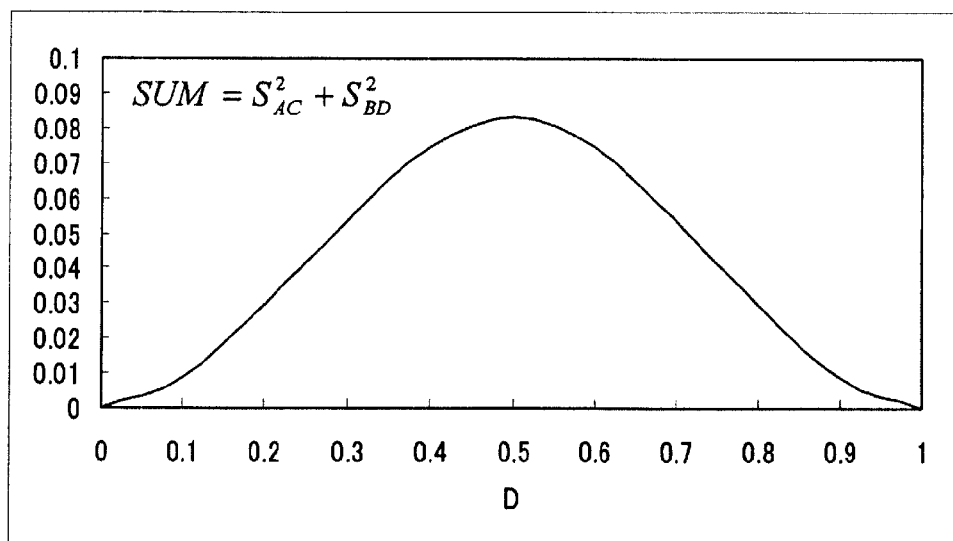
FIG. 14 is a view showing an example of a value of SUM with respect to each duty ratio according to the first embodiment of the present invention.
FIG. 15 is a view showing a relationship between the duty ratio D and the SUM according to the first embodiment of the present invention.

The term shown in this Equation (19) takes the value shown in FIG. 14 with respect to the duty ratio D.

FIG. 15 is a view showing the relationship between the duty ratio D and the SUM according to the first embodiment of the present invention.

In FIG. 15, based on the value shown in Table 1, the duty ratio D is plotted on the abscissa, and the SUM ($=S_{AC}^2+S_{BD}^2$) is plotted on the ordinate.

As shown in FIG. 15, the SUM ($=S_{AC}^2+S_{BD}^2$) becomes the maximum when the duty ratio D=0.5.

When the duty ratio D becomes the maximum, the SUM shown in Equation (18) can be represented as in Equation (20).

(Equation 15)

$$SUM = S_{AC}^2 + S_{BD}^2 = 0.08333L12 \quad (20)$$

As shown in Equation (20), when the light emitting period T3 of the light source 11 is 4n times the field period, the detection unit 139 can detect the component of the waveform, that is, the luminance of the light, with the highest precision.

The third processing unit 137 performs the processing shown in Equation (17) to Equation (18) and calculates the SUM in units of pixels as shown in Equation (20) so that the duty ratio D becomes the maximum.

Then, the third processing unit 137 outputs this SUM as the processing result C to the imaging target extraction unit 138 in frame synchronization.

[Details of Imaging Target Extraction Unit 138]

Below, details of the imaging target extraction unit 138 will be explained.

Figure 16:
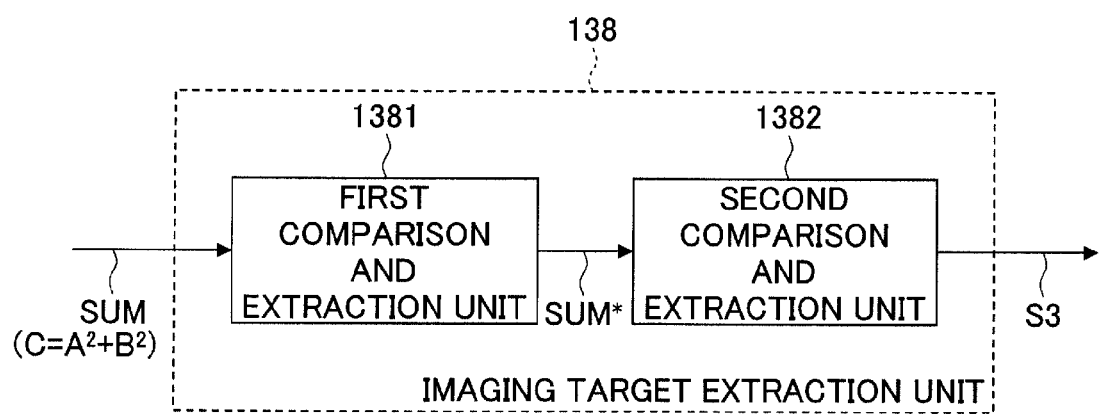
FIG. 16 is a block diagram showing an example of a detailed configuration of an imaging target extraction unit according to the first embodiment of the present invention.

FIG. 16 is a block diagram showing an example of a detailed configuration of the imaging target extraction unit according to the first embodiment of the present invention.

As shown in FIG. 16, the imaging target extraction unit 138 has a first comparison and extraction unit 1381 and a second comparison and extraction unit 1382.

As previously explained, the imaging target extraction unit 138 extracts the processing results of the luminance signal component of the imaging target from the processing results C of the third processing unit 137 and eliminates processing results other than that as noise.

[Details of First Comparison and Extraction unit 1381]

First, the first comparison and extraction unit 1381 will be explained.

Figure 17:
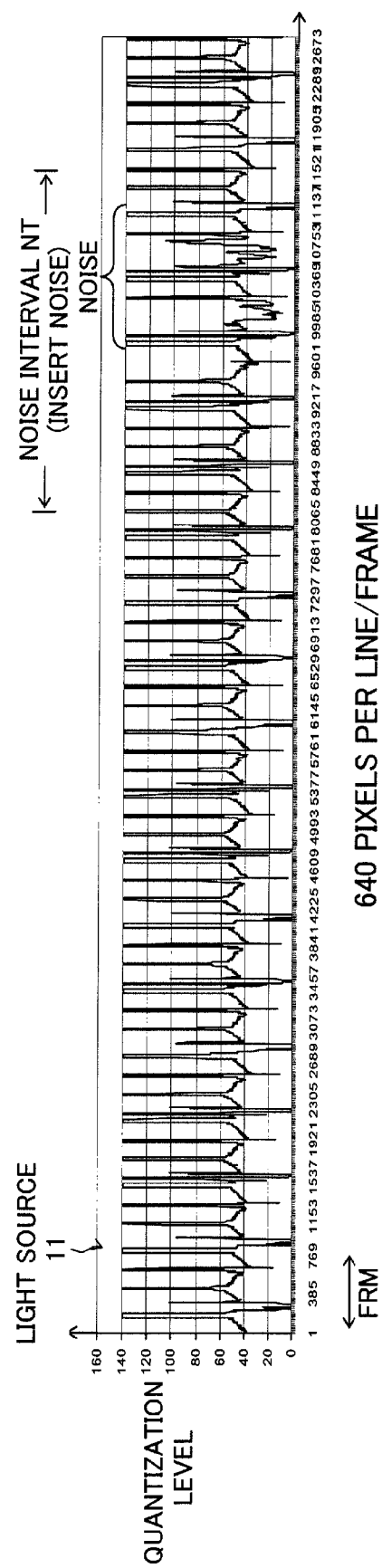
FIG. 17 is a view showing an example of a luminance signal adjusted by the adjustment unit according to the first embodiment of the present invention.

FIG. 17 is a view showing an example of the luminance signal adjusted by the adjustment unit according to the first embodiment of the present invention. The ordinate shows the quantization level of the luminance signal, while the abscissa shows 640 pixels per line repeated for each frame FRM.

FIG. 17 basically shows same signal as the luminance signal shown in FIG. 11. However, this differs from the former in the point that a noise interval NT is inserted.

This noise interval NT is an interval for inserting noise generated by an unnecessary moving object having motion. However, this is merely provided for clarifying the explanation of the imaging target extraction unit 138.

Here, a concrete example of an unnecessary moving object having motion will be mentioned.

FIGS. 18(A) to 18(C) are schematic views showing a concrete example of a moving object having motion.

As shown in FIGS. 18(A) to 18(C), as a concrete example of a moving object having motion, hand movement performed with respect to the image capturing unit 12 at a position away from the image capturing unit 12 by about 50 cm in the noise interval NT when capturing the light source 11 under a fluorescent lamp will be mentioned as an example. For convenience of explanation, it is assumed that such hand movement is performed by a period close to the flicker frequency of the light source 11, for example, 15 Hz.

Figure 19:
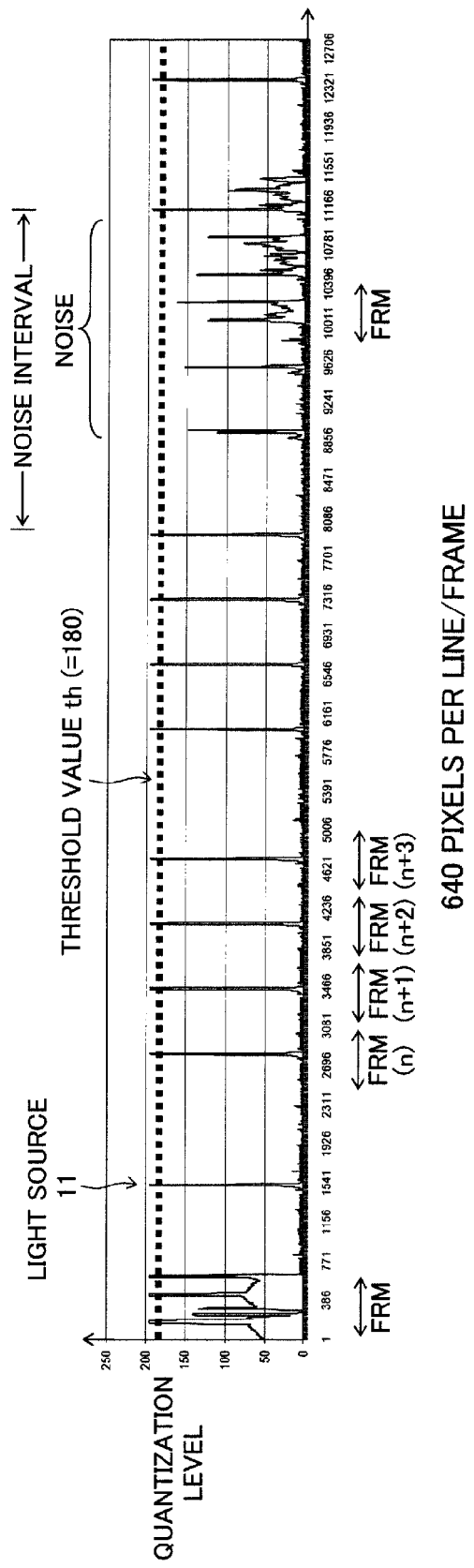
FIG. 19 is a view showing an example of processing results of a third processing unit according to the first embodiment of the present invention.
Figure 20:
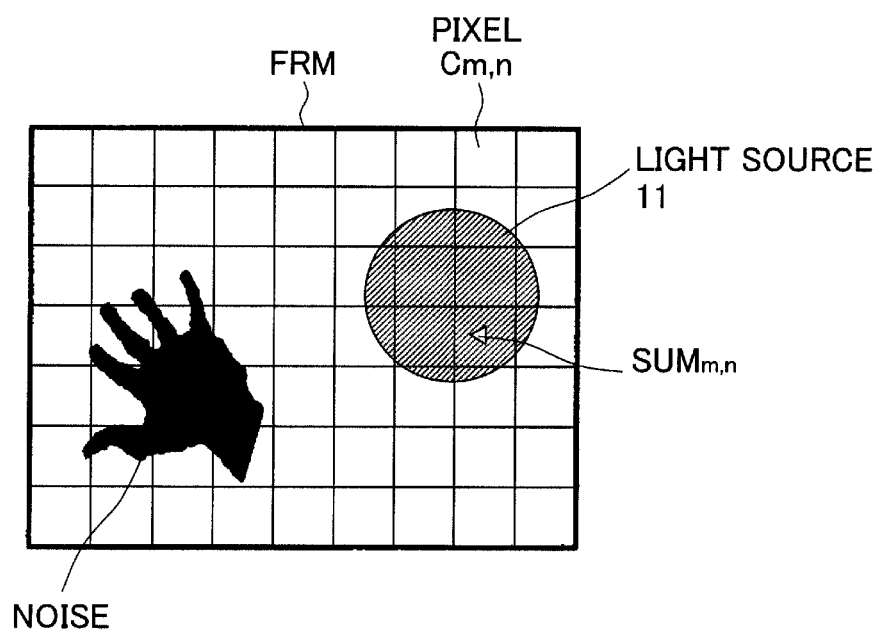
FIG. 20 is a view showing an example of processing results of a third processing unit according to the first embodiment of the present invention.

When noise constituted by hand movement is captured together with the light source 11, the third processing unit can obtain the SUM as shown in FIG. 19 and FIG. 20.

FIG. 19 is a view showing an example of the processing results of the third processing unit according to the first embodiment of the present invention. The ordinate shows the quantization level of the SUM, while the abscissa shows 640 pixels per line repeated for each frame FRM.

As shown in FIG. 19, with regard to the SUM as the processing results C, the quantization level based on the luminance signal component of the light source 11 becomes the maximum before and after (nearly) 190.

The hand movement was performed by a period near the flicker frequency of the light source 11, therefore the third processing unit 137 ends up processing even the luminance signal component of the noise portion. Noise taking the maximum value across the quantization level 170 is generated in the noise interval NT.

Note that, the adjustment unit 132 adjusted the signal level of the luminance signal level Y, therefore overflow is suppressed, and the maximum value of the SUM is kept within the maximum value of the quantization level, that is, 255.

FIG. 20 is a view showing an example of the processing results of the third processing unit according to the first embodiment of the present invention as well. FIG. 20 shows the SUM in a certain frame FRM in the noise interval NT in two dimensions. It is assumed that the SUM in the pixel $C_{m,n}$ is suitably represented as $SUM_{m,n}$.

As shown in FIG. 20, the noise portion is displayed black and forms the shape of a palm. As explained above, this portion has a relatively high quantization level. The value of that is about 50 to about 170. In the vicinity of the palm, the portion of the light source 11 is displayed by hatching. This portion also has a high quantization level. The maximum value thereof is before and after (nearly) 190.

It is seen from these processing results that the luminance signal of the pixel $C_{m,n}$ having a quantization level exceeding 180 may be extracted in order to eliminate the noise component and extract the $SUM_{m,n}$ which was processed based on the luminance signal component of the light source 11 as the imaging target.

Therefore, the first comparison and extraction unit 1381 sets the threshold value th so that th=180 and performs the following first comparison and extraction processing for the SUM (=processing result C) which is input from the third processing unit 137 for each frame.

First, the first comparison and extraction unit 1381 compares the $SUM_{m,n}$ with the threshold value th in units of pixels.

In this comparison, whether the $SUM_{m,n}$ exceeds the threshold value th is judged using the binary value of 0 or 1.

Specifically, when the $SUM_{m,n}$ is the threshold value th or more, the first comparison and extraction unit 1381 adds a judgment flag F=1 to the $SUM_{m,n}$.

On the other hand, when the $SUM_{m,n}$ is less than the threshold value th, the first comparison and extraction unit 1381 adds a judgment flag F=0 to the $SUM_{m,n}$.

Note that, the threshold value th is preferably set within a range of values capable of separating the noise component and the imaging target.

Next, the first comparison and extraction unit 1381 extracts the $SUM_{m,n}$ to which the judgment flag F=1 is added, that is the $SUM_{m,n}$ of the pixel $C_{m,n}$ exceeding the threshold value th, in units of pixels for each frame. Due to this, the portion of the light source 11 displayed by the hatching portion in FIG. 20 is extracted.

On the other hand, the first comparison and extraction unit 1381 suspends the extraction for the $SUM_{m,n}$ to which the judgment flag F=0 is added. The first comparison and extraction unit 1381 may eliminate this $SUM_{m,n}$ as well.

Then, the extracted $SUM_{m,n}$ as $SUM^*_{m,n}$ to the second comparison and extraction unit 1382 in frame synchronization.

The results of this first comparison and extraction processing will be explained with reference to FIG. 21 and FIG. 22.

Figure 21:
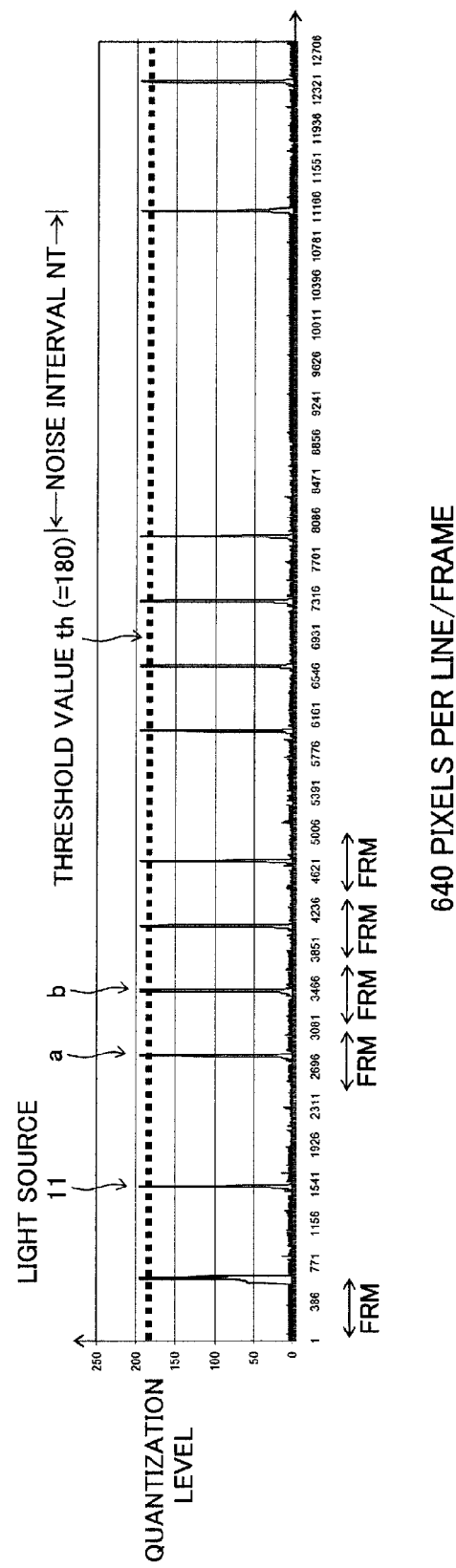
FIG. 21 is a view showing an example of extraction results of a first comparison and extraction unit according to the first embodiment of the present invention.
Figure 22:
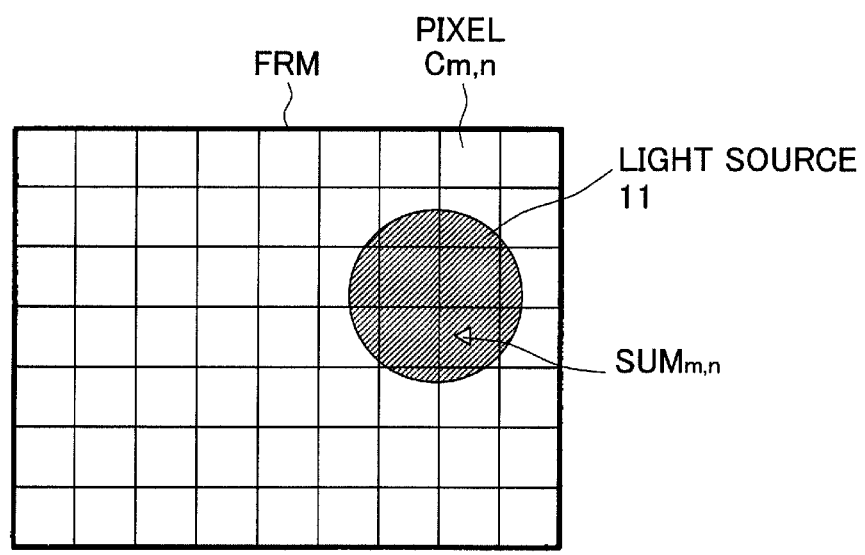
FIG. 22 is a view showing an example of extraction results of the first comparison and extraction unit according to the first embodiment of the present invention.

FIG. 21 and FIG. 22 are views showing an example of the extraction results of the first comparison and extraction unit according to the first embodiment of the present invention.

In FIG. 21, the ordinate shows the quantization level, while the abscissa shows 640 pixels per line repeated for each frame FRM.

FIG. 22 shows the SUM extracted in a certain frame FRM in the noise interval NT in two dimensions.

As shown in FIG. 21 and FIG. 22, it is seen that the SUM which is stripped of noise generated due to the hand movement in the noise interval NT and is processed based on the luminance signal component of the light source 11 is extracted by the first comparison and extraction unit 1381.

[Details of Second Comparison and Extraction Unit 1382]

Next, the second comparison and extraction unit 1382 will be explained.

As explained above, the first comparison and extraction unit 1381 eliminates noise generated by a moving object having motion.

Accordingly, it becomes possible for the detection unit 139 to detect the imaging target based on the SUM, and it is possible to generate a captured image in which this imaging target is projected.

However, even when the SUM at the time when it exceeds the threshold value th is extracted, as shown in FIG. 21, a low noise of about several levels sometimes remains. In this case, there is a possibility that the detection unit 139 will erroneously detect this low noise as the imaging target and that the low noise will be mixed in the captured image.

Therefore, in order to eliminate such low noise as well and obtain a clearer captured image, the second comparison and extraction unit 1382 performs the following second comparison and extraction processing for the SUM* input from the first comparison and extraction unit 1381.

First, when receiving as input the $SUM^*_{m,n}$ in the n-th frame FRM, the second comparison and extraction unit 1382 stores this once in the first memory unit 133. In terms of software, the second comparison and extraction unit 1382 replaces this $SUM^*_{m,n}$ with a variable SUM**, then stores the $SUM^*_{m,n}$ in the first memory unit 133.

After that, when receiving as input the $SUM^*_{m,n}$ in the (n+1)th frame FRM, the second comparison and extraction unit 1382 reads out the $SUM^*_{m,n}$ in the n-th frame FRM stored in the first memory unit 133.

The second comparison and extraction unit 1382 compares the $SUM^*_{m,n}$ in the n-th frame FRM with the $SUM^*_{m,n}$ in the (n+1)th frame FRM in units of pixels.

In the previous first comparison and extraction processing, the judgment flag F is added to the $SUM^*_{m,n}$.

For this reason, the second comparison and extraction unit 1382 judges whether the judgment flag Fn added to the $SUM^*_{m,n}$ in the n-th frame FRM and the judgment flag Fn+1 added to the $SUM^*_{m,n}$ in the (n+1)th frame FRM coincide.

In other words, it judges whether a logical OR ANS (=Fn AND Fn+1) between the judgment flag Fn and the judgment flag Fn+1 is 1.

When the two coincide (ANS=1), the second comparison and extraction unit 1382 extracts the $SUM^*_{m,n}$ in the (n+1)th frame FRM to which the judgment flag Fn+1 is added.

When the two do not coincide (ANS=0), the second comparison and extraction unit 1382 eliminates the $SUM^*_{m,n}$ in the n-th frame FRM to which the judgment flag Fn is added.

The results of this second comparison and extraction processing will be explained with reference to FIG. 21 and FIG. 23.

Figure 23:
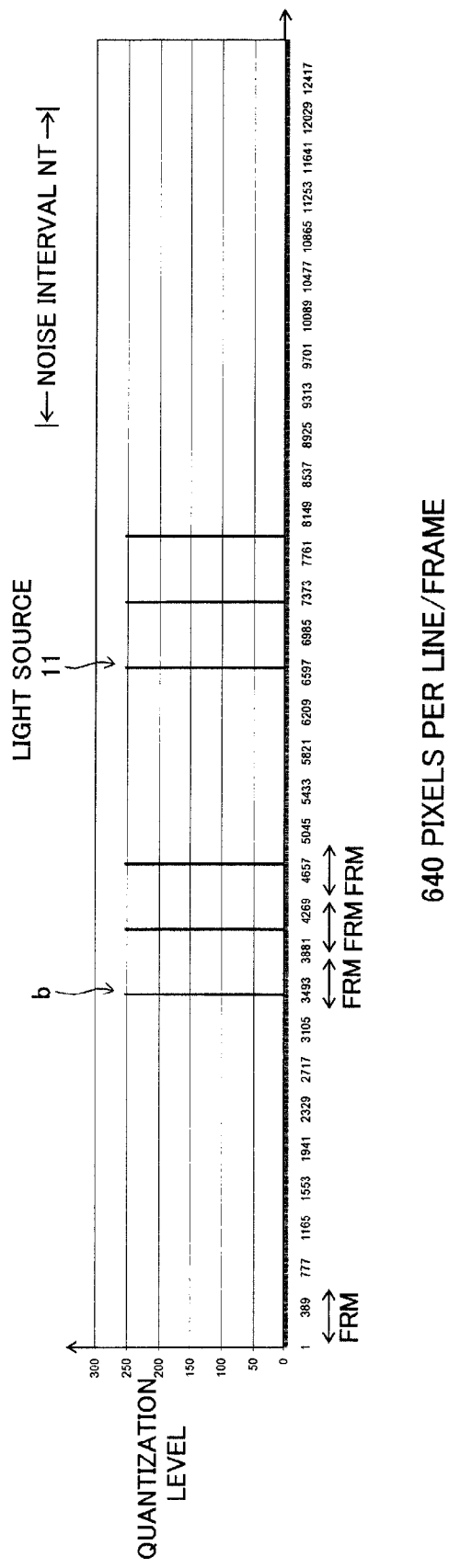
FIG. 23 is a view showing an example of extraction results of a second comparison and extraction unit according to the first embodiment of the present invention.

FIG. 23 is a view showing an example of extraction results of the second comparison and extraction unit according to the first embodiment of the present invention. The ordinate shows the quantization level, while the abscissa shows 640 pixels per line repeated for each frame FRM.

The quantization levels of the same pixels $C_{m,n}$ indicated by notations "a" and "b" in FIG. 21 will be explained as an example. Here, for simplification of explanation, it is assumed that the two have a common quantization level exceeding the threshold value th=180.

As explained above, the second comparison and extraction unit 1382 extracts the same pixels in two consecutive frames FRM which have quantization levels coincident with each other.

Accordingly, the quantization level of the pixel $C_{m,n}$ in the frame FRM indicated by the notation "a" and the quantization level of the pixel $C_{m,n}$ in the frame FRM indicated by the notation "b" are compared.

In this case, the two coincide. Therefore, as shown in FIG. 23, the quantization level of the pixel $C_{m,n}$ indicated by the notation "a" is eliminated, and the quantization level of the pixel $C_{m,n}$ indicated by the notation "b" is extracted.

When the second comparison and extraction processing is applied to the quantization levels of the other pixels as well, as shown in FIG. 23, it is seen that the luminance signals of pixels exceeding the threshold value th are extracted, and low noise is eliminated.

This is because even at the same pixels, frequently the low noise has a quantization level different at each frame FRM.

In a general imaging apparatus, image processing apparatus, etc., in order to eliminate the unnecessary signal component as explained above, the inter-frame difference method is widely used.

However, in the detection system 10, when a general inter-frame difference method is applied to the processing result C of the third processing unit 137, there is a high possibility of occurrence of the following inconvenience.

Figure 24:
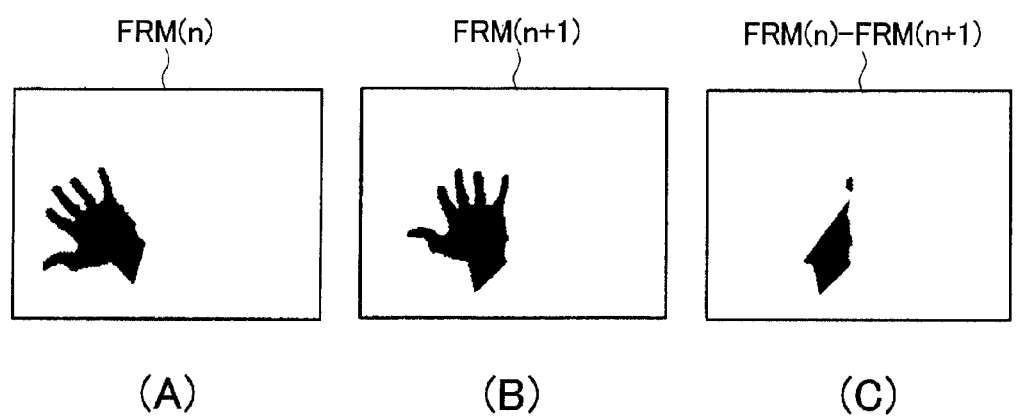
FIGS. 24(A) to 24(C) are views for explaining an inconvenience in a case where a general inter-frame difference is applied to the processing results of a third processing unit according to the first embodiment of the present invention.

FIGS. 24(A) to 24(C) are views for explaining the inconvenience of a case where the general inter-frame difference is applied to the processing results of the third processing unit according to the first embodiment of the present invention.

FIG. 24(A) illustrates the processing results of the third processing unit 137 in the n-th frame FRM(n). FIG. 24(B) illustrates the processing results of the third processing unit 137 in the (n+1)th frame FRM(n+1).

The processing results shown in FIGS. 24(A) and 24(B) are obtained under the same conditions as those in FIGS. 18(A) to 18(C).

In the general inter-frame difference method, for example, when there is no difference between two frames FRM, if the luminance signals of pixels having no difference are eliminated, the unnecessary noise components shown in FIGS. 24(A) and 24(B) can be eliminated.

However, in pixels where the differences of two frames coincide, as shown in FIG. 24(C), an unnecessary noise component remains.

The cause of this resides in that the detection system 10 makes the light source 11 flicker, therefore a tendency of increase of pixels where the differences of two frames coincide becomes stronger with respect to a moving object having a period close to the flicker frequency of the light source 11.

Accordingly, in the detection system 10, not a general inter-frame difference method, but elimination of noise using the imaging target extraction unit 138 explained above is carried out.

[Details of Correction Instruction Unit 1310]

Below, details of the correction instruction unit 1310 will be explained.

Figure 25:
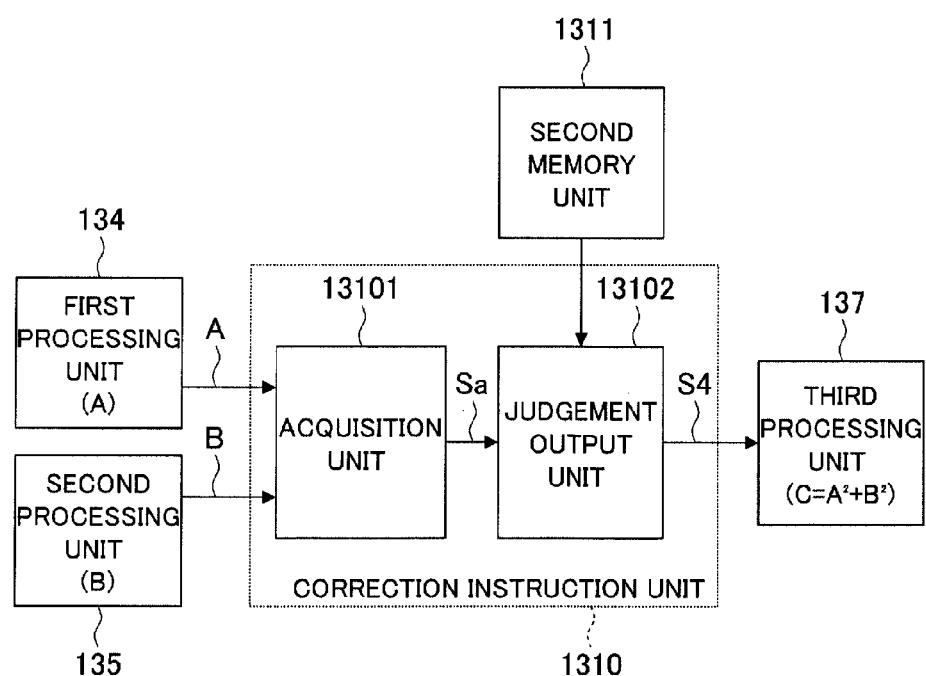
FIG. 25 is a block diagram showing an example of a detailed configuration of a correction instruction unit according to the first embodiment of the present invention.

FIG. 25 is a block diagram showing an example of the detailed configuration of the correction instruction unit according to the first embodiment of the present invention.

As shown in FIG. 25, the correction instruction unit 1310 has an acquisition unit 13101 and a judgment output unit 13102.

[Details of Acquisition Unit 13101]

First, the acquisition unit 13101 will be explained.

Figure 26:
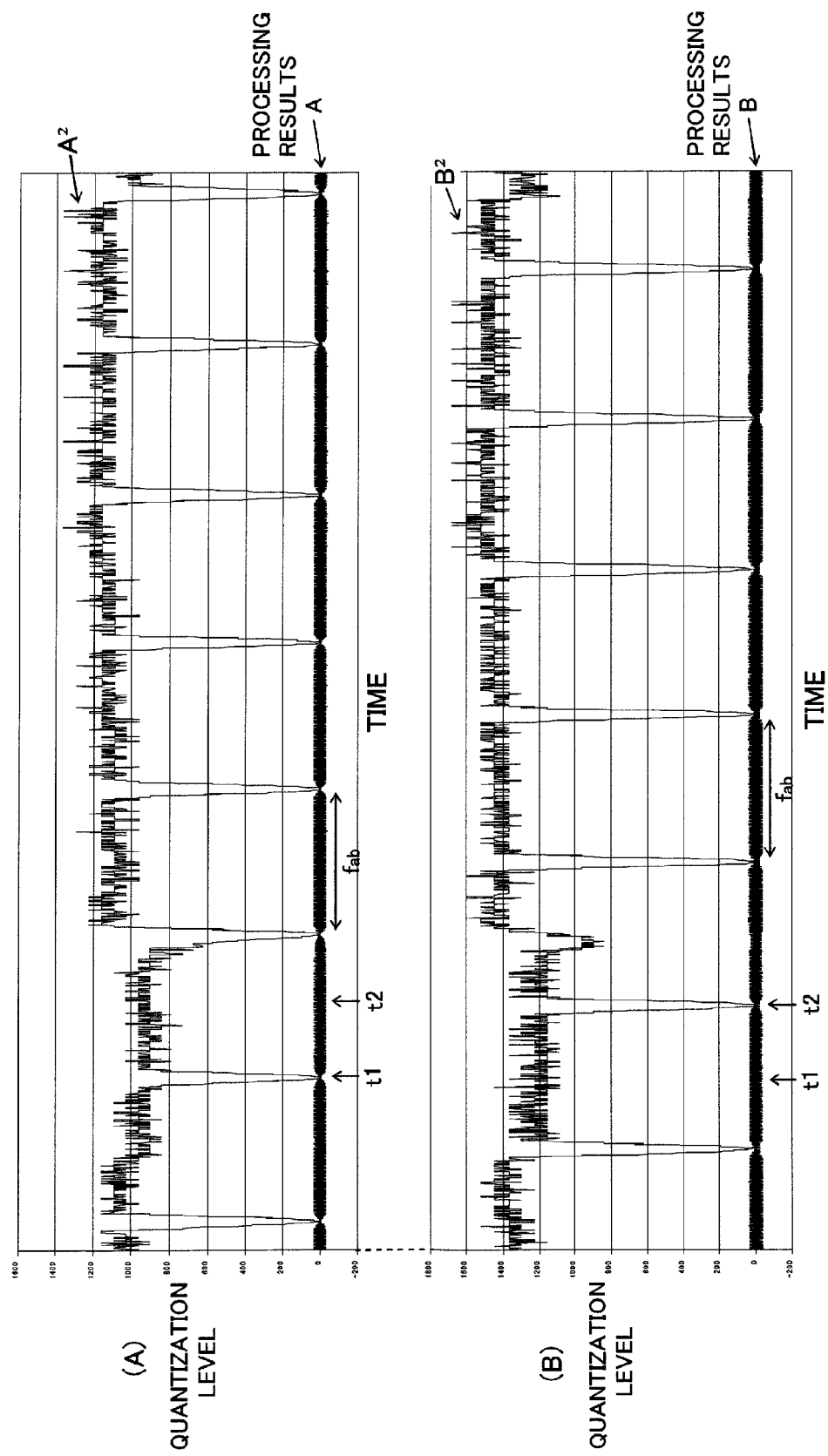
FIGS. 26(A) and 26(B) are views showing concrete examples of processing results A and processing results B according to the first embodiment of the present invention.

FIGS. 26(A) and 26(B) are views showing concrete examples of the processing results A and processing results B according to the first embodiment of the present invention.

The ordinate shows the quantization level, while the abscissa shows the time. Note that, FIGS. 26(A) and 26(B) also show square values of the processing results A and processing results B.

As shown in FIG. 25, the acquisition unit 13101 receives as input the processing results A from the first processing unit 134 and receives as input the processing results B from the second processing unit 135.

The processing results A give the time average $S_{AC}$ calculated by using Equation (8) and take values as shown in FIG. 26(A).

The processing results B give the time average $S_{BD}$ calculated by using Equation (9) and take values as shown in FIG. 26(B).

Note that, the processing results A and processing results B are results obtained under the same conditions as those shown in FIGS. 2(A) and 2(B), that is, in the case where the light emitting frequency of the light source 11 is set to 15 Hz and in the case where the field frequency of the image capturing unit 12 is set to 60 Hz.

Under the above conditions, the processing results A give a value of about −50 or 50. That value infinitely converges to 0 in an approximately 13-second period ($\approx f_{ab}$). Also, the processing results B give a value of about −50 or 50. That value infinitely converges to 0 in an approximately 13-second period ($\approx f_{ab}$).

As previously explained, the processing performed by the second processing unit 135 for the luminance signal S2 is carried out with a delay of approximately ¼ of the period relative to the processing performed by the first processing unit 134 for the luminance signal S2, therefore the value of the processing results B infinitely converges to 0 with a delay of approximately ¼ of the period ($f_{ab}/4$) from the time when the value of the processing results A infinitely converges to 0 (time when a gap is generated).

Naturally, the square value of the processing results A and the square value of the processing results B also infinitely converge to 0 in an approximately 13-second period. These square values are used when the third processing unit 137 calculates the SUM=$A^2+B^2$.

Figure 27:
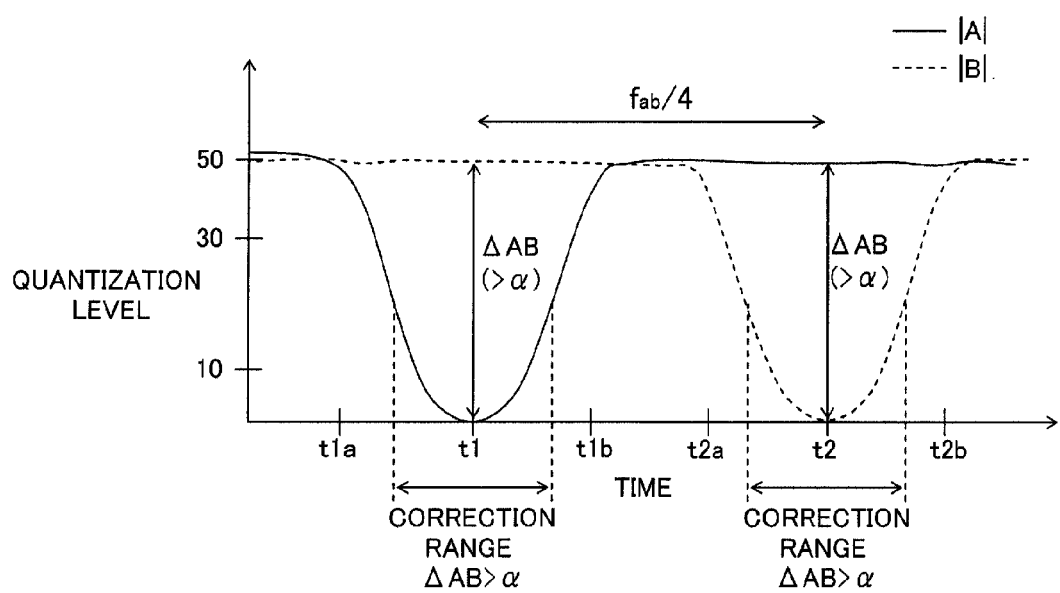
FIG. 27 is a partially enlarged view of the vicinity of a time t1 and a time t2 shown in FIGS. 26(A) and 26(B).

FIG. 27 is a partially enlarged view of the vicinity of the time t1 and the time t2 shown in FIGS. 26(A) and 26(B). Note, in FIG. 27, the absolute value of the processing results A is indicated by a solid line, while the absolute value of the processing results B is indicated by a broken line.

As shown in FIG. 27, the absolute value of the processing results A, for example, begins to fall at a time t1a, infinitely converges to 0 at the time t1, then, at a time t1b, returns to the degree of the value at the time t1a.

On the other hand, the absolute value of the processing results B, for example, begins to fall at a time t1b, infinitely converges to 0 at the time t2, then, at a time t2b, returns to the degree of the value at the time t2a. Note that, the interval between the time t1 and the time t2 corresponds to the period $f_{ab}/4$.

For this reason, a difference ΔAB between the absolute value of the processing results A and the absolute value of the processing results B also increases for a term from the time t1$a$ to the time t1, then is reduced at the time t1$b$, increases again for a term from the time t2$a$ to the time t2, then is reduced at the time t2$b$.

Naturally, the value of the processing result C (SUM=$A^2$+$B^2$) fluctuates too in accordance with the fluctuation of this difference ΔAB. As a result, the larger the difference ΔAB, the larger the gap ΔG caused by the processing results C as well. This causes erroneous detection of the object OBJ in the detection unit 139.

In order to prevent this erroneous detection, the correction explained above may be carried out on the processing results A or processing results B when the difference ΔAB is generated.

Therefore, the acquisition unit 13101 acquires the difference ΔAB between the absolute value of the processing results A and the absolute value of the processing results B, that is, the difference ΔAB between the absolute value of the time average $S_{AC}$ and the absolute value of the time average $S_{BD}$.

Then, the acquisition unit 13101 outputs the difference ΔAB as an acquisition signal Sa to the judgment output unit 13102.

[Details of Judgment Output Unit 13102]

In order to prevent occurrence of a gap ΔG, the correction explained above may be carried out. Realistically, however, it is an extremely rare for the difference ΔAB to become 0 unless there is an object OBJ. If the difference ΔAB is very small, the possibility of erroneous detection of the object OBJ is low as well.

Accordingly, it is substantially sufficient if the correction explained above is carried out when the difference ΔAB exceeds the allowable value α and would cause the erroneous detection of the object OBJ.

Therefore, the judgment output unit 13102 compares the difference ΔAB input from the acquisition unit 13101 with the allowable quantity α of the correction data stored in the second memory unit 1311 and judges whether the difference ΔAB exceeds the allowable quantity α.

In other words, the difference ΔAB is one reflecting the amount of drop of the absolute value of the processing results A or processing results B, therefore it is also possible to grasp this as judging if this drop exceeds the allowable quantity α.

Further, the judgment output unit 13102 outputs a correction instruction signal S4 instructing correction to the third processing unit 137 when the difference ΔAB exceeds the allowable quantity α.

The allowable quantity α may be set to a value that causes erroneous detection of the object OBJ, for example, about 15% of the processing results A and processing results B. In the present embodiment, the allowable quantity α is set to, for example, the quantization level 30. This may be set at the stage of shipment of the detection system 10 or may be set by the user.

In the example of the processing results A and processing results B shown in FIG. 27, in the vicinity of the time t1 and the time t2, the difference ΔAB exceeds the allowable quantity α(=30) (ΔAB>α). Below, the time of the range where this difference ΔAB exceeds the allowable quantity α will be referred to as a "correction range".

The judgment output unit 13102 outputs the correction instruction signal S4 to the third processing unit 137 in the correction range. Then, the third processing unit 137 performs the correction in the correction range.

As shown in FIG. 27, for the term from the time t1$a$ to the time t1$b$, the absolute value of the processing result A is smaller than the absolute value of the processing result B. Therefore, in this term, correction may be made so that the absolute value of the processing result A becomes the degree of the absolute value of the processing result B.

For the term from the time t2$a$ to the time t2$b$, the absolute value of the processing results B is smaller than the absolute value of the processing results A. Therefore, during this term, correction may be made so that the absolute value of the processing results B becomes the degree of the absolute value of the processing results A.

Therefore, when receiving the correction instruction signal S4, the third processing unit 137 compares the absolute value of the processing results A and the absolute value of the processing results B before calculating the SUM.

When the absolute value of the processing results A is smaller than the absolute value of the processing results B (|A|<|B|), the third processing unit 137 does not use the processing results A and calculates SUM=$B^2+B^2(=S_{BD}^2+S_{BD}^2)$ in place of calculation of the SUM=$A^2+B^2$.

That is, by substituting the processing results A having a large drop of the absolute value with the other processing results B having a small drop of the absolute value, the absolute value of the processing result A is corrected to the degree of the absolute value of the processing result B.

On the other hand, when the absolute value of the processing results A is larger than the absolute value of the processing results B (|A|>|B|), the third processing unit 137 does not use the processing results B and calculates SUM=$A^2+A^2(=S_{AC}^2+S_{AC}^2)$ in place of calculation of the SUM=$A^2+B^2$.

That is, by substituting the processing results B having a large drop of the absolute value with the other processing results A having a small drop of the absolute value, the absolute value of the processing result B is corrected to the degree of the absolute value of the processing result A.

The effect of the correction will be explained by comparing the SUM where such correction is carried out with the SUM where no correction is carried out.

Figure 28:
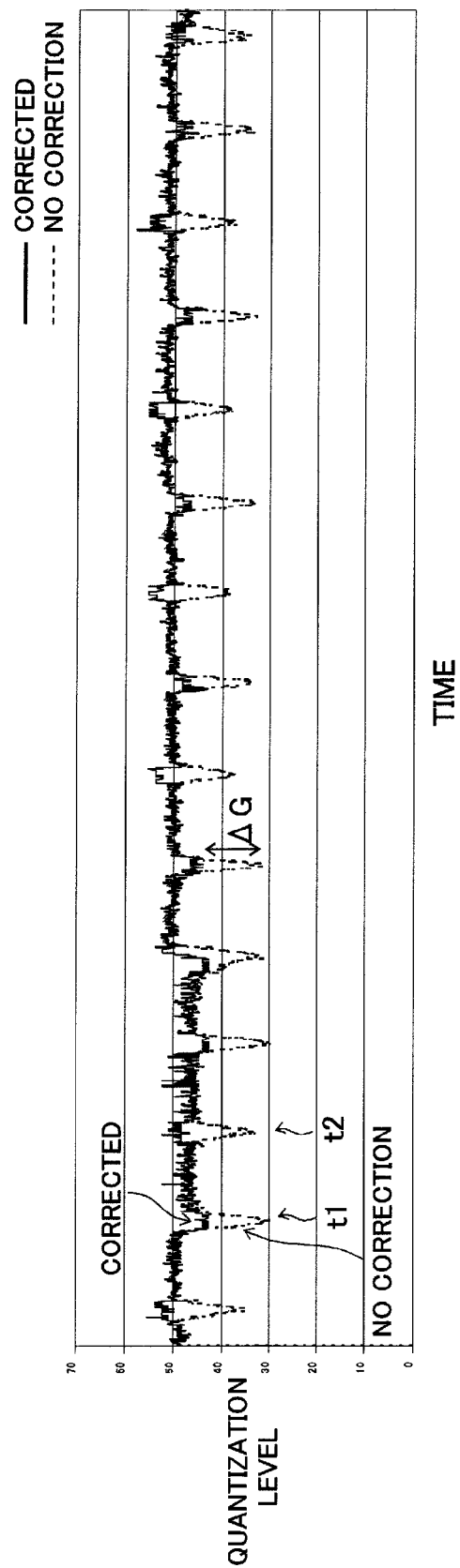
FIG. 28 is a view for explaining an effect of correction according to the first embodiment of the present invention.

FIG. 28 is a view for explaining the effect of the correction according to the first embodiment of the present invention. The ordinate shows the quantization level, while the abscissa shows the time.

Note, assume that the SUM=$A^2+B^2$ is calculated by using the processing results A and processing results B shown in FIGS. 26(A) and 26(B).

When correction is not carried out for the processing results A and processing results B, as indicated by the broken line in FIG. 28, the gap ΔG is formed.

This is because, as explained above, for example, when A is infinitely close to 0, the SUM is calculated as SUM≈$0^2+B^2=B^2$.

Contrary to this, when the above correction is carried out, as indicated by the solid line in FIG. 28, the gap ΔG is suppressed.

As a result, a stable luminance signal can be obtained, therefore the noise of the processing result C is suitably eliminated at the imaging target extraction unit 138, and it becomes possible to prevent erroneous detection of the object OBJ in the detection unit 139.

[Example of Operation of Detection System 10]

Next, the operation of the detection system 10 will be explained.

Figure 29:
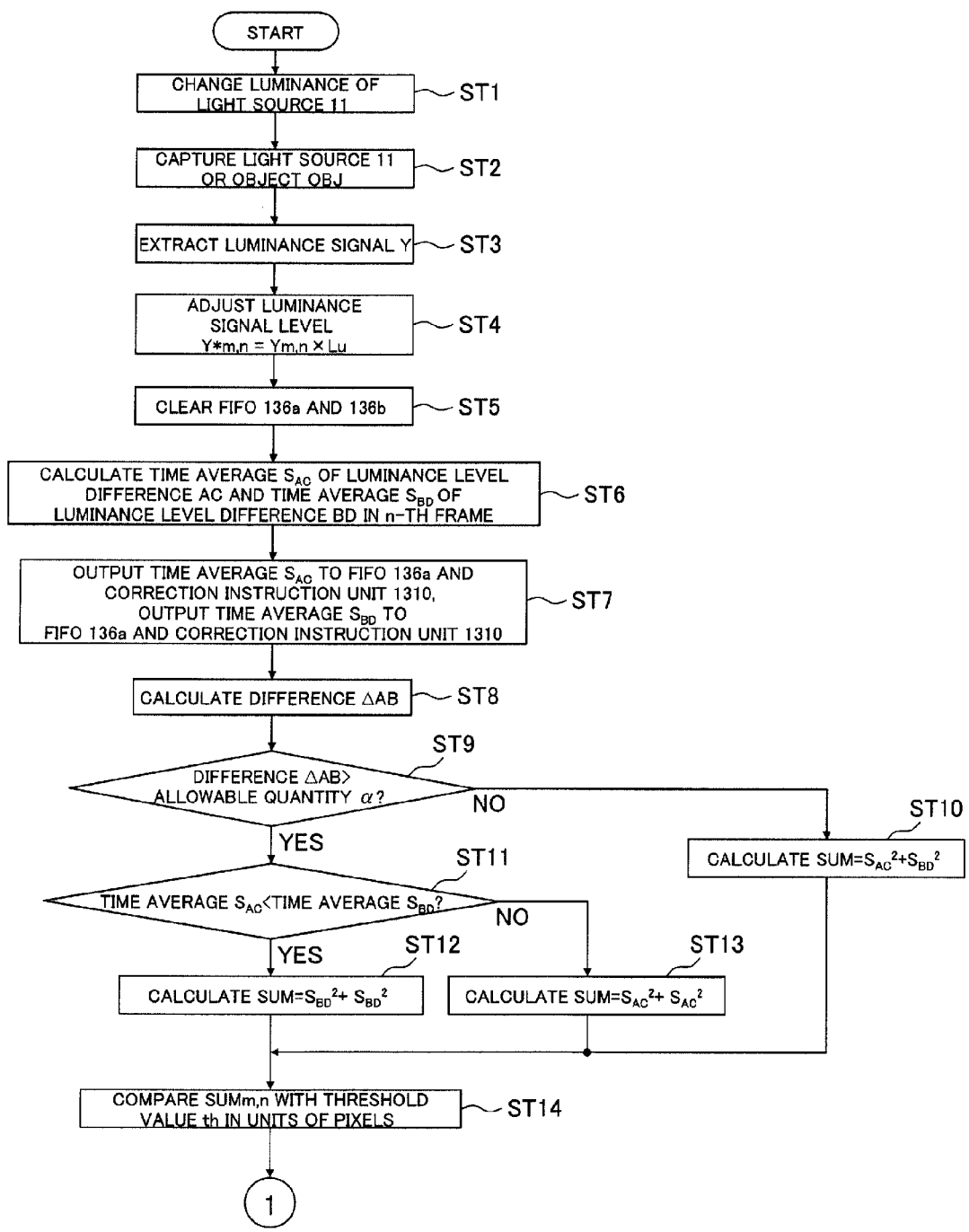
FIG. 29 is a flow chart showing an example of operation of a detection system according to the first embodiment of the present invention.
Figure 30:
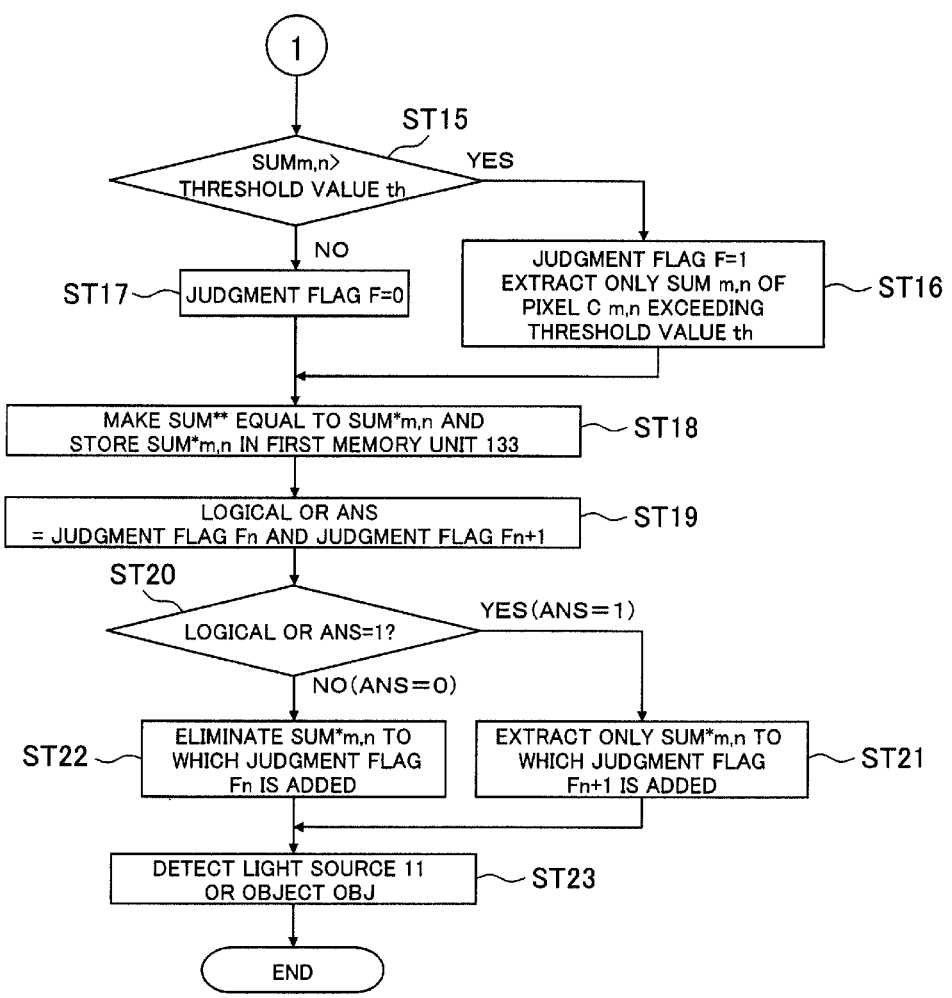
FIG. 30 is a flow chart showing an example of operation of a detection system according to the first embodiment of the present invention.

FIG. 29 and FIG. 30 are flow charts showing an example of the operation of the detection system according to the first embodiment of the present invention.

As shown in FIG. 29, the luminance of the light source 11 is changed by a period of 4n (n=1, 2, . . . ) times the field period of the image capturing unit 12.

Then, the image capturing unit 12 captures the light source 11 or the object OBJ illuminated by the light source 11 (ST2).

After that, when receiving as input the imaging signal S1 from the image capturing unit 12, the luminance signal extraction unit 131 extracts the luminance signal from this (ST3). Then, the luminance signal extraction unit 131 outputs this extracted luminance signal Y to the adjustment unit 132.

The adjustment unit 132 adjusts the signal level of the luminance signal Y input from the luminance signal extraction unit 131 (ST4).

At this time, the adjustment unit 132 refers to the conversion value table 1331 stored in the first memory unit 133 and multiplies the luminance signal Y by the conversion value Lu in units of pixels in accordance with the mode ($Y^*_{m,n} = Y_{m,n} \times Lu$). Then, the adjustment unit 132 outputs the processing value $Y^*_{m,n}$ as the luminance signal S2 to the first processing unit 134 and second processing unit 135.

After clearing the FIFO 136a and 136b (ST5), the first processing unit 134 calculates the time average $S_{AC}$ of the luminance level difference AC in units of pixels based on the processing value $Y^*_{m,n}$ (ST6). Together with this, the second processing unit 135 calculates the time average $S_{BD}$ of the luminance level difference BD in units of pixels based on the processing value $Y^*_{m,n}$ (ST6).

Then, the first processing unit 134 outputs the time average $S_{AC}$ as the processing results A to the FIFO 136a and the correction instruction unit 1310 (ST7). The second processing unit 135 outputs the time average $S_{BD}$ as the processing results B to the FIFO 136b and the correction instruction unit 1310 (ST7).

Then, the acquisition unit 13101 acquires the difference $\Delta AB$ between the absolute value of the time average $S_{AC}$ and the absolute value of the time average $S_{BD}$ (ST8). Then, the acquisition unit 13101 outputs the difference $\Delta AB$ as the acquisition signal Sa to the judgment output unit 13102.

Next, the judgment output unit 13102 compares the difference $\Delta AB$ input from the acquisition unit 13101 with the allowable quantity $\alpha$ of the correction data stored in the second memory unit 1311 and judges whether the difference $\Delta AB$ exceeds the allowable quantity $\alpha$ (ST9).

When, at step ST9, the difference $\Delta AB$ does not exceed the allowable quantity $\alpha$ (NO), the judgment output unit 13102 does not output the correction instruction signal S4 to the third processing unit 137.

Accordingly, when receiving as input the processing results A from the FIFO 136a and receiving as input the processing results B from the FIFO 136b, the third processing unit 137 calculates the SUM of the square of the processing results A and the square of the processing results B ($C = A^2 + B^2 = S_{AC}^2 + S_{BD}^2$) in units of pixels (ST10). Then, the third processing unit 137 outputs this SUM as the processing results C to the first comparison and extraction unit 1381 of the imaging target extraction unit 138.

On the other hand, when, at step ST9, the difference $\Delta AB$ exceeds the allowable quantity $\alpha$ (YES), the judgment output unit 13102 outputs the correction instruction signal S4 instructing correction to the third processing unit 137.

Subsequently, when receiving the correction instruction signal S4, before calculating the SUM, the third processing unit 137 compares the absolute value of the processing results A ($=S_{AC}$) with the absolute value of the processing results B ($=S_{BD}$).

When, at step ST11, the absolute value of the processing results A is smaller than the absolute value of the processing results B (YES), the third processing unit 137 calculates the SUM ($=B^2+B^2=S_{BD}^2+S_{BD}^2$) in place of calculation of the SUM ($=A^2+B^2$) (ST12).

On the other hand, when, at step ST11, the absolute value of the processing results A is larger than the absolute value of the processing results B (NO), the third processing unit 137 calculates the SUM ($C=A^2+A^2=S_{AC}^2+S_{AC}^2$) in place of calculation of the SUM ($C=A^2+B^2$) (ST13).

After calculating the SUM, the third processing unit 137 outputs this as the processing results C to the first comparison and extraction unit 1381 of the imaging target extraction unit 138.

The first comparison and extraction unit 1381 sets the threshold value th so that th=180 and compares the $\text{SUM}_{m,n}$ with the threshold value th in units of pixels (ST14).

As shown in FIG. 30, when the $\text{SUM}_{m,n}$ is the threshold value th or more (YES of ST15), the first comparison and extraction unit 1381 adds the judgment flag F=1 to the $\text{SUM}_{m,n}$.

On the other hand, when the $\text{SUM}_{m,n}$ is less than the threshold value th (NO of ST15), the first comparison and extraction unit 1381 adds the judgment flag F=0 to the $\text{SUM}_{m,n}$.

After that, the first comparison and extraction unit 1381 extracts the $\text{SUM}_{m,n}$ to which the judgment flag F=1 is added, that is, the $\text{SUM}_{m,n}$ of pixels $C_{m,n}$ exceeding the threshold value th, in units of pixels for each frame (ST16).

Then, the first comparison and extraction unit 1381 outputs the extracted $\text{SUM}_{m,n}$ as the $\text{SUM}^*_{m,n}$ to the second comparison and extraction unit 1382 in frame synchronization.

On the other hand, the first comparison and extraction unit 1381 suspends the extraction for the $\text{SUM}_{m,n}$ to which the judgment flag F=0 is added (ST17).

Next, when receiving as input the $\text{SUM}^*_{m,n}$ in the n-th frame FRM, the second comparison and extraction unit 1382 stores this once in the first memory unit 133 (ST18).

After that, when receiving as input the $\text{SUM}^*_{m,n}$ in the (n+1)th frame FRM, the second comparison and extraction unit 1382 reads out the $\text{SUM}^*_{m,n}$ in the n-th frame FRM stored in the first memory unit 133.

Then, the second comparison and extraction unit 1382 compares the $\text{SUM}^*_{m,n}$ in the n-th frame FRM with the $\text{SUM}^*_{m,n}$ in the (n+1)th frame FRM in units of pixels (ST19).

When the two coincide (YES of ST20, ANS=1), the second comparison and extraction unit 1382 extracts the $\text{SUM}^*_{m,n}$ in the (n+1)th frame FRM to which the judgment flag Fn+1 is added (ST21).

On the other hand, when the two do not coincide (NO of ST20, ANS=0), the second comparison and extraction unit 1382 eliminates the $\text{SUM}^*_{m,n}$ in the n-th frame FRM to which the judgment flag Fn is added (ST22).

Finally, when receiving as input the extraction result S3 from the second comparison and extraction unit 1382 of the imaging target extraction unit 138, the detection unit 139 detects the state of the imaging target based on this (ST23).

The detection result of the detection unit 139 is input to the not shown image processing apparatus etc., whereby a captured image in which the detected imaging target is projected is generated.

Note that, when calculating the difference $\Delta AB$ at step ST8, the difference $\Delta AB$ between the square of the time average $S_{AC}$ ($S_{AC}^2$) and the square of the time average $S_{BD}$ ($S_{BD}^2$) may be acquired and $S_{AC}^2$ and $S_{BD}^2$ may be compared at step ST11 as well.

At step ST21, in place of extraction of the $\text{SUM}^*_{m,n}$ in the (n+1)th frame FRM to which the judgment flag Fn+1 is added, the $\text{SUM}^*_{m,n}$ in the n-th frame FRM to which the judgment flag Fn is added may be extracted as well.

In the present embodiment, the judgment flag F is used, therefore the judgment according to the logical OR ANS is carried out. However, at step ST15, rather than judgment using the logical OR ANS, judgment using the difference can be carried out as well.

Specifically, the second comparison and extraction unit 1382 may calculate the difference $\Delta SUM$ (={SUM*$_{m,n}$@n frame}−{SUM*$_{m,n}$@(n+1) frame}) between the SUM*(mn) in the n-th frame FRM and the SUM*$_{m,n}$ in the (n+1)th frame FRM and extract the SUM*$_{m,n}$ when $\Delta SUM=0$ as well.

The above image capturing unit 12 performs interlace scanning by field storage. However, in place of this, interlace scanning by frame storage or non-interlace scanning by the frame storage may be carried out as well.

When performing interlace scanning by frame storage, the luminance of the light source 11 is changed by a period of 4n times the frame period, and the signal processing unit 13 applies the above signal processing to the imaging signal S1 for each 2n fields in units of fields.

When performing non-interlace scanning by frame storage, the luminance of the light source 11 is changed by a period of 4n times the frame period, and the signal processing unit 13 applies the above signal processing to the imaging signal S1 for each n fields in units of frames.

According to the first embodiment, even when the flicker frequency of the light source and the scanning frequency of the imaging apparatus are asynchronous, the imaging target constituted by the light source or the object illuminated by that light source is detected with a high precision, and the imaging target can be clearly captured.

Second Embodiment

The detection system 10 explained in the first embodiment detects the imaging target constituted by the light source or the object illuminated by that light source with a high precision even when the flicker frequency of the light source 11 and the scanning frequency of the image capturing unit 12 are asynchronous and can clearly capture the imaging target, therefore can be applied to, for example, a smoke sensor.

In the second embodiment, a smoke sensor using the detection system 10 will be explained.

[Example of Configuration of Smoke Sensor 2]

Figure 31:
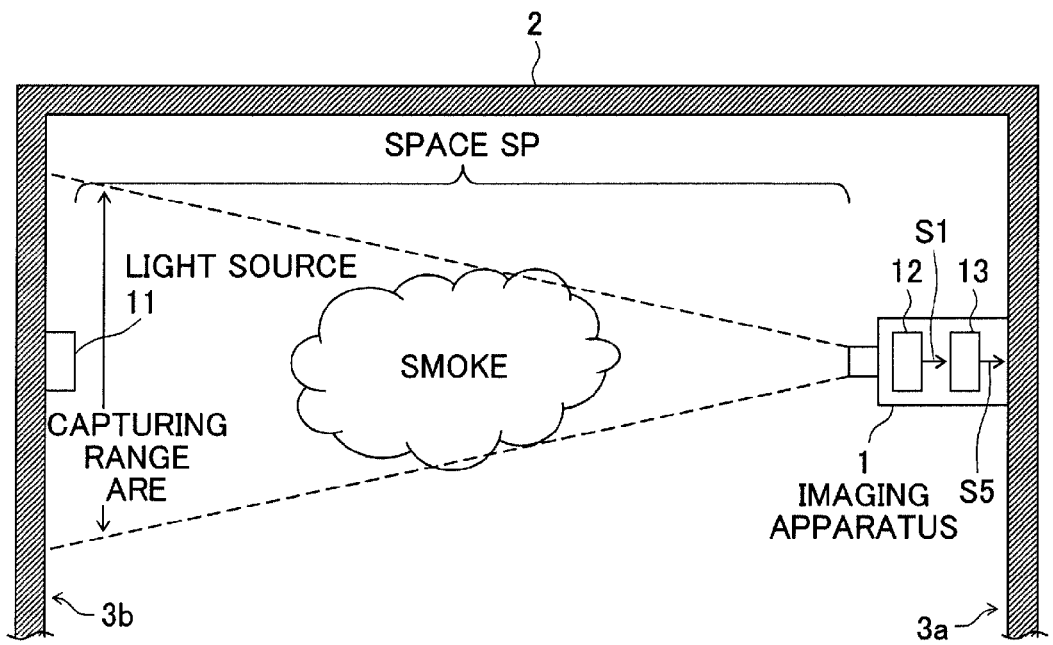
FIG. 31 is a general schematic view showing an example of the configuration of a smoke sensor according to a second embodiment of the present invention.

FIG. 31 is a general schematic view showing an example of the configuration of the smoke sensor according to the second embodiment of the present invention. In FIG. 31, only principal parts of the smoke sensor 2 are shown.

As shown in FIG. 31, the smoke sensor 2 has an imaging apparatus 1 and light source 11. This imaging apparatus 1 has the image capturing unit 12 and signal processing unit 13 shown in FIG. 1.

In this way, the detection system 10 is mounted in the smoke sensor 2.

The housing of the smoke sensor 2 is formed in, for example, an approximately columnar shape around the imaging apparatus 1 and light source 11. Note, FIG. 31 shows only the peripheral portions of the imaging apparatus 1 and light source 11.

In that housing, a hole portion for allowing smoke generated in a fire to flow into a space SP inside the housing without allowing the light emitted by the light source 11 to leak to the outside of the housing is preferably disposed. The smoke sensor 2 perceives the smoke flowing into this space SP and outputs a detection signal indicating detection of smoke. This detection signal is input to, for example, a sound unit (not shown) for emitting an alarm sound.

The imaging apparatus 1 is set at a side surface portion 3a of the smoke sensor 2 so that it can capture an image of the light source 11. At the time of occurrence of a fire, smoke generated due to this flows into the space SP, therefore, due to the smoke, a transmission rate of the light becomes lower than that in a normal period. Note that, the normal period designates the state where there is no smoke in the space SP.

Accordingly, at the time of occurrence of a fire, the light emitted by the light source 11 is captured darker than that in the normal period. In other words, at the time of occurrence of a fire, the luminance becomes lower than that in the normal period.

Therefore, the imaging apparatus 1 grasps the fluctuation of the transmission rate as the fluctuation of the luminance signal level and detects this.

The signal processing unit 13 extracts the luminance signal Y (see FIG. 1) based on the imaging signal S1 output by the image capturing unit 12 and monitors this luminance signal level. When detecting the fluctuation of this luminance signal level, the signal processing unit 13 judges that there is smoke generated due to a fire etc. in the space SP and outputs the detection signal S5.

At the time of detection of fluctuation of the luminance signal level explained above, the detection unit 139 (see FIG. 1) performs the processing which will be explained below.

Specifically, when receiving as input the extraction result S3 from the imaging target extraction unit 138, the detection unit 139 compares a value V1 of the extraction result S3 in the (n−1)th frame and a value V2 of the extraction result S3 in the n-th frame.

When the value V2 falls from the value V1, that is, when the SUM in the n-th frame is smaller than the SUM in the (n−1)th frame, the detection unit 139 judges that fluctuation occurred in the luminance signal level.

In this case, the detection unit 139 outputs the detection signal S5 indicating the detection of smoke to the outside. The detection signal S5 is output to, for example, a display device outside the smoke sensor 2.

The light source 11 is set in the side surface portion 3b facing the side surface portion 3a in which the imaging apparatus 1 is set so that it is within the capturing range ARE of the imaging apparatus 1.

As the light source 11, use can be made of, for example, near-infrared LEDs emitting near-infrared rays (about 945 nm).

As explained above, the smoke sensor 2 need only detect fluctuation of the luminance signal level, therefore the light source 11 may be kept on all the time as the light source.

However, in an initial period of occurrence of a fire, sometimes the concentration of the smoke in the space SP is low, so the fluctuation of the transmission rate of the light is small. In this case, the fluctuation of the luminance signal level is liable to be small as well, so this fluctuation cannot be detected.

In the present embodiment, the detection system 10 is employed as a smoke sensor 2. Therefore, even when the fluctuation of the transmission rate of the light is small, fluctuation of the luminance signal level can be detected.

In more detail, the signal processing unit 13 applies the signal processing which is the characteristic feature of the present embodiment to the imaging signal S1 output by the image capturing unit 12, therefore noise etc. due to the ambient light is eliminated, and this fluctuation can be captured even if the fluctuation of the luminance is minute.

[Example of Operation of Smoke Sensor 2]

Next, an example of the operation of the smoke sensor 2 will be explained with reference to FIG. 32.

Figure 32:
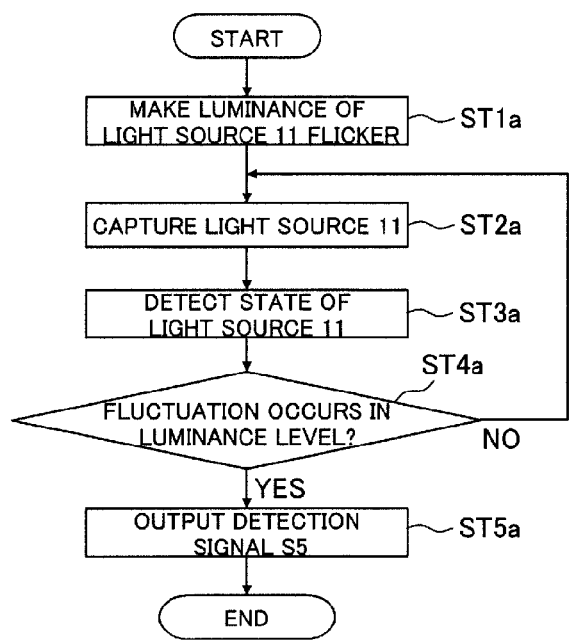
FIG. 32 is a flow chart showing an example of operation of a smoke sensor according to a second embodiment of the present invention.

FIG. 32 is a flow chart showing an example of the operation of the smoke sensor according to the second embodiment of the present invention.

As shown in FIG. 32, the light source 11 is made to flicker so that the light emitting period T3 becomes 4n times the field period (ST1a).

Next, the image capturing unit 12 captures the light source 11 and outputs the captured image data as the imaging signal S1 to the signal processing unit 13 (ST2a).

After that, the signal processing unit 13 executes the processing of steps ST3 to ST23 shown in FIG. 29 and FIG. 30 and detects the fluctuation of the luminance signal level, that is, the state of the light source 11 (ST3a).

When a fluctuation occurs in the luminance signal level (YES of ST4a), the detection unit 139 outputs the detection signal S5 indicating the detection of smoke (ST5a). Due to this, one series of processing ends.

On the other hand, when no fluctuation occur in the luminance signal level (NO of ST4a), the processing of step ST2a is restarted.

In this regard, the imaging apparatus 1 captures the light source 11. For this reason, the situation of the light source 11 can be output as a captured image or moving picture to an external display apparatus etc.

When a fire occurs, the smoke sensor 2 outputs the detection signal S5 and outputs the situation of the light source 11 as the captured image or moving picture to this display apparatus as well.

Due to this, the situation of the space SP inside the housing can be visually confirmed in a safe place, and an erroneous alarm can be prevented as well.

As described above, according to the second embodiment, the following effects can be obtained.

In the smoke sensor 2, the imaging apparatus 1 may capture the light source 11, therefore it is not affected much by the ambient light, and minute fluctuation of luminance can be detected. For this reason, the occurrence of fire can be perceived high precisely and quickly.

The general photo-electric separated type smoke sensor is configured by a light emitting part emitting light and a light receiving part which is set to face the light emitting part and receives this light, therefore alignment of the optical axis is indispensable.

Contrary to this, in the smoke sensor 2 of the first embodiment, the light source 11 is captured by using the imaging apparatus 1, and the fluctuation of the luminance signal level is detected, therefore the light source 11 need only be kept within the capturing range ARE of the imaging apparatus 1, so alignment of the optical axis is not necessary.

Further, as shown in Equation (10), the SUM does not depend upon the phase difference θ of the light. Therefore, so long as a frequency component where $f_1=(2n-1)f_2$ stands is contained in the frequency $f_1$ of the light received by the image capturing unit 12, the luminance can be detected. Accordingly, there is the advantage that synchronization between the timing of the scanning on the imaging apparatus 1 side and the timing of the light emission on the light source 11 side is not necessary.

REFERENCE SIGNS LIST

1 . . . imaging apparatus, 10 . . . detection system, 11 . . . light source, 12 . . . image capturing unit, 13 . . . signal processing unit, 121 . . . CCD, 131 . . . luminance signal extraction unit, 132 . . . adjustment unit, 133 . . . first memory unit, 134 . . . first processing unit, 135 . . . second processing unit, 136a, 136b . . . FIFO, 137 . . . third processing unit, 138 . . . imaging target extraction unit, 139 . . . detection unit, 1211 . . . photodiode, 1212 . . . vertical transfer CCD, 1213 . . . horizontal transfer CCD, 1214 . . . amplifier, 1310 . . . correction instruction unit, 1311 . . . second memory unit, 1331 . . . conversion value table, 1381 . . . first comparison and extraction unit, 1382 . . . second comparison and extraction unit, 13101 . . . acquisition unit, 13102 . . . judgment output unit, 2 . . . smoke sensor, 3a . . . side surface portion, and 3b . . . side surface portion.

The invention claimed is:

1. A detection system comprising:
an image capturing unit which captures an image;
a light source which has a luminance which changes by a period of a predetermined multiple of a scanning plane period of the image capturing unit;
a pre-processing unit which acquires an output signal at the time when the image capturing unit captures the light source or object for each predetermined scanning plane period, calculates a first time-average value of the output signal level difference between the m (m=1, 2, . . . )th and (m+2)th scanning planes, and calculates a second time-average value of the output signal level difference between the (m+1)th and (m+3)th scanning planes;
a post-processing unit which executes processing which uses the first time-average value and the second time-average value calculated by the pre-processing unit as the basis to detect the state of the light source or the object;
a detection unit which detects the state of the light source or the object in accordance with the processing value of the post-processing unit; and
a correction instruction unit which outputs a correction instruction signal in a case where an absolute value of either of the first time-average value and the second time-average value of the pre-processing unit exceeds an allowable drop, wherein
the post-processing unit corrects the time-average value of the time-average value which drops in absolute value until the drop becomes the allowable drop or less when receiving the correction instruction signal of the correction instruction unit and then executes the above processing.

2. A detection system as set forth in claim 1, wherein the post-processing unit, when receiving the correction instruction signal of the correction instruction unit, substitutes the time-average value having a lower absolute value of time average between the first time-average value and the second time-average value with the other time-average value and calculates a sum of a square value of the first time-average and a square value of the second time-average.

3. A detection system as set forth in claim 2, wherein the correction instruction unit comprises
an acquisition unit which acquires the difference between the absolute value of the first time average and the absolute value of the second time average,
a judgment units which compares a drop constituted by the difference acquired by the acquisition unit with the allowable drop and judges whether the drop exceeds the allowable drop, and
an output unit which outputs the correction instruction signal when the drop exceeds the allowable drop as a result of judgment by the judgment unit.

4. A detection system as set forth in claim 2, wherein the detection system has an adjustment unit which adjusts the output signal level of the image capturing unit to a signal level that can suppress overflow in the processing in the pre-processing unit and the post-processing unit.

5. A detection system as set forth in claim 2, wherein:
the detection system has an extraction unit which compares the processing value of the post-processing unit with the threshold value and extracts the processing value at the time when it exceeds the threshold value as the processing value based on the output signal component of the light source or the object, and
the detection unit detects the state of the light source or the state of the object in accordance with the processing value extracted by the extraction unit.

6. A detection system as set forth in claim 1, wherein the correction instruction unit comprises
an acquisition unit which acquires the difference between the absolute value of the first time average and the absolute value of the second time average,
a judgment units which compares a drop constituted by the difference acquired by the acquisition unit with the allowable drop and judges whether the drop exceeds the allowable drop, and
an output unit which outputs the correction instruction signal when the drop exceeds the allowable drop as a result of judgment by the judgment unit.

7. A detection system as set forth in claim 6, wherein the detection system has an adjustment unit which adjusts the output signal level of the image capturing unit to a signal level that can suppress overflow in the processing in the pre-processing unit and the post-processing unit.

8. A detection system as set forth in claim 6, wherein:
the detection system has an extraction unit which compares the processing value of the post-processing unit with the threshold value and extracts the processing value at the time when it exceeds the threshold value as the processing value based on the output signal component of the light source or the object, and
the detection unit detects the state of the light source or the state of the object in accordance with the processing value extracted by the extraction unit.

9. A detection system as set forth in claim 1, wherein the detection system has an adjustment unit which adjusts the output signal level of the image capturing unit to a signal level that can suppress overflow in the processing in the pre-processing unit and the post-processing unit.

10. A detection system as set forth in claim 9, wherein:
the detection system has an extraction unit which compares the processing value of the post-processing unit with the threshold value and extracts the processing value at the time when it exceeds the threshold value as the processing value based on the output signal component of the light source or the object, and
the detection unit detects the state of the light source or the state of the object in accordance with the processing value extracted by the extraction unit.

11. A detection system as set forth in claim 1, wherein:
the detection system has an extraction unit which compares the processing value of the post-processing unit with the threshold value and extracts the processing value at the time when it exceeds the threshold value as the processing value based on the output signal component of the light source or the object, and
the detection unit detects the state of the light source or the state of the object in accordance with the processing value extracted by the extraction unit.

12. A signal processing method of a detection system which has a light source and an image capturing unit which captures an image of a light source or an object illuminated by the light source,
which signal processing method of a detection system includes:
step one: changing a luminance of the light source by a period of a predetermined multiple of a scanning plane period of the image capturing unit;
step two: acquiring an output signal of the image capturing unit for each predetermined scanning plane period;
step three: calculating a first time-average value of the output signal level difference between the m-th and (m+2)th scanning planes and calculating a second time-average value of the output signal level difference between the (m+1)th and (m+3)th scanning planes from the output signals acquired in the above second step;
step four: outputting a correction instruction signal when an absolute value of either the first time-average value and the second time-average value in the third step exceeds an allowable drop;
step five: correcting the time-average value of the time-average value which drops in absolute value until the drop becomes not more than an allowable drop when receiving the correction instruction signal in the fourth step;
step six: executing processing which uses the first time-average value and the second time-average value corrected in the fifth step as the basis to detect the state of the light source or the object; and
step seven: of detecting the state of the light source or the object in accordance with the processing value in the sixth step.

13. A smoke sensor comprising:
an image capturing unit which captures an image; at least one light source which is set to face the image capturing unit within a capturing range of the image capturing unit and which has a luminance changing by a period of a predetermined multiple of a scanning plane period of the image capturing unit; and
a signal processing unit which outputs a detection signal which indicates detection of smoke in a case where the image capturing unit captures an image of the light source and detects a change of level of the output signal which is output in accordance with the light quantity of the light source and the output signal level is outside of the defined range, wherein the signal processing unit has
a pre-processing unit which acquires the output signal for each predetermined scanning plane period, calculates a first time-average value of the output signal level difference between the m-th and (m+2)th scanning planes, and calculates a second time-average value of the output signal level difference between the (m+1)th and (m+3)th scanning planes,
a post-processing unit which executes processing which uses the first time-average value and the second time-average value calculated by the pre-processing unit as the basis to detect the state of the light source,
a detection unit which detects the state of the light source in accordance with the processing value of the post-processing unit, and
a correction instruction unit which outputs a correction instruction signal when the absolute value of either the first time-average value and the second time-average value of the pre-processing unit exceeds an allowable drop, wherein the post-processing unit corrects the time-average value of the time-average value which drops in absolute value until the drop becomes the allowable drop or less and executes the processing when receiving the correction instruction signal of the correction instruction unit.

* * * * *